United States Patent
Yamano

(10) Patent No.: US 8,934,046 B2
(45) Date of Patent: Jan. 13, 2015

(54) ZOOM LENS AND IMAGE CAPTURING APPARATUS

(71) Applicant: Sony Corporation, Tokyo (JP)

(72) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/949,771

(22) Filed: Jul. 24, 2013

(65) Prior Publication Data

US 2014/0085531 A1 Mar. 27, 2014

(30) Foreign Application Priority Data

Sep. 27, 2012 (JP) ................................. 2012-213327

(51) Int. Cl.
| | | |
|---|---|---|
| *G02B 13/16* | (2006.01) | |
| *H04N 5/262* | (2006.01) | |
| *G02B 15/14* | (2006.01) | |
| *G02B 9/34* | (2006.01) | |
| *H04N 5/232* | (2006.01) | |
| *G02B 15/173* | (2006.01) | |

(52) U.S. Cl.
CPC ............ *G02B 15/14* (2013.01); *H04N 5/23212* (2013.01); *G02B 15/173* (2013.01)

USPC ......... 348/335; 348/240.3; 359/687; 359/774

(58) Field of Classification Search
None
See application file for complete search history.

(56) References Cited

U.S. PATENT DOCUMENTS

| | | | |
|---|---|---|---|
| 2009/0180199 A1* | 7/2009 | Endo | 359/686 |
| 2009/0207501 A1* | 8/2009 | Yokoyama | 359/684 |
| 2012/0229913 A1* | 9/2012 | Hara | 359/683 |

FOREIGN PATENT DOCUMENTS

JP    2006-301474    11/2006

\* cited by examiner

*Primary Examiner* — Justin P Misleh
(74) *Attorney, Agent, or Firm* — Rader, Fishman & Grauer PLLC

(57) ABSTRACT

There is provided a zoom lens including a first focus lens group having negative refractive power and moving in orientation to an image side along an optical axis in focusing from a long distance to a short distance, and a second focus lens group having positive refractive power, the second focus lens group being arranged on a closer side to an image relative to the first focus lens group and moving along the optical axis in focusing. The first and second focus lens groups move in association with each other.

19 Claims, 16 Drawing Sheets

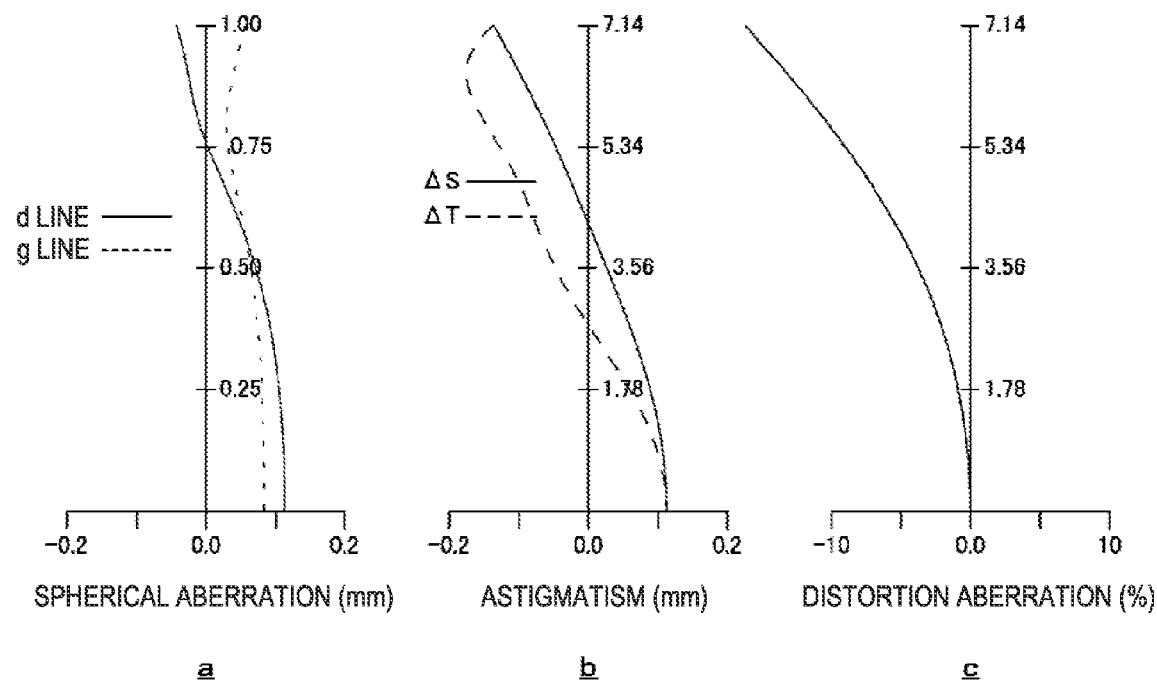
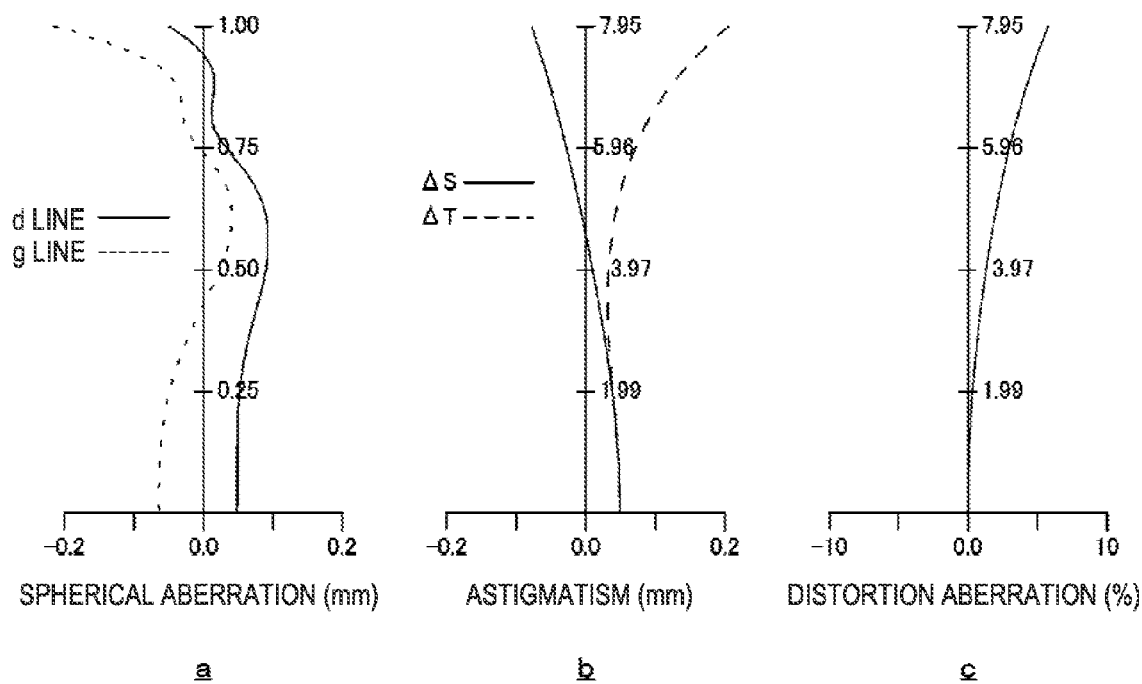

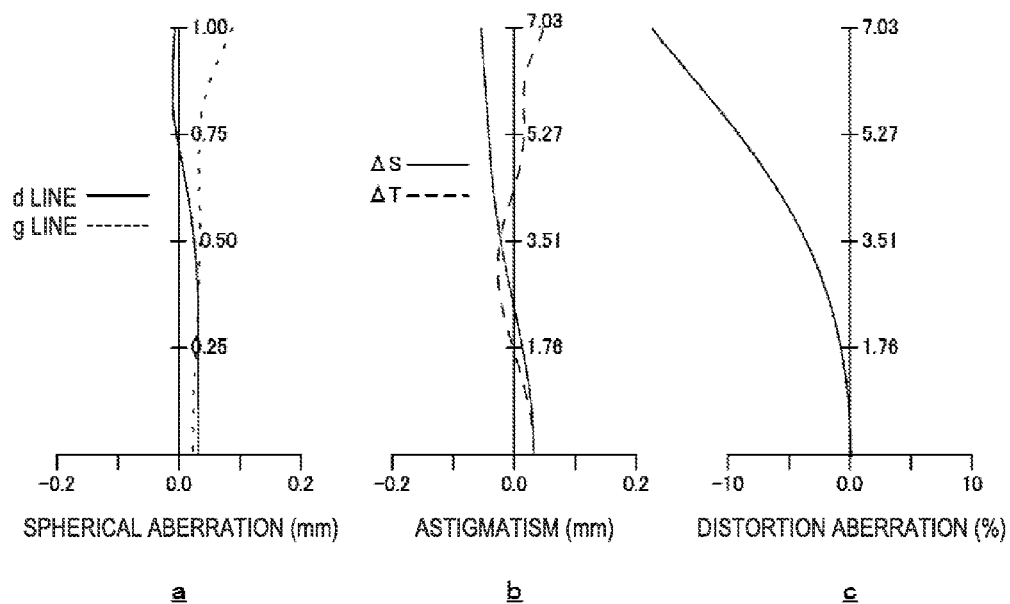
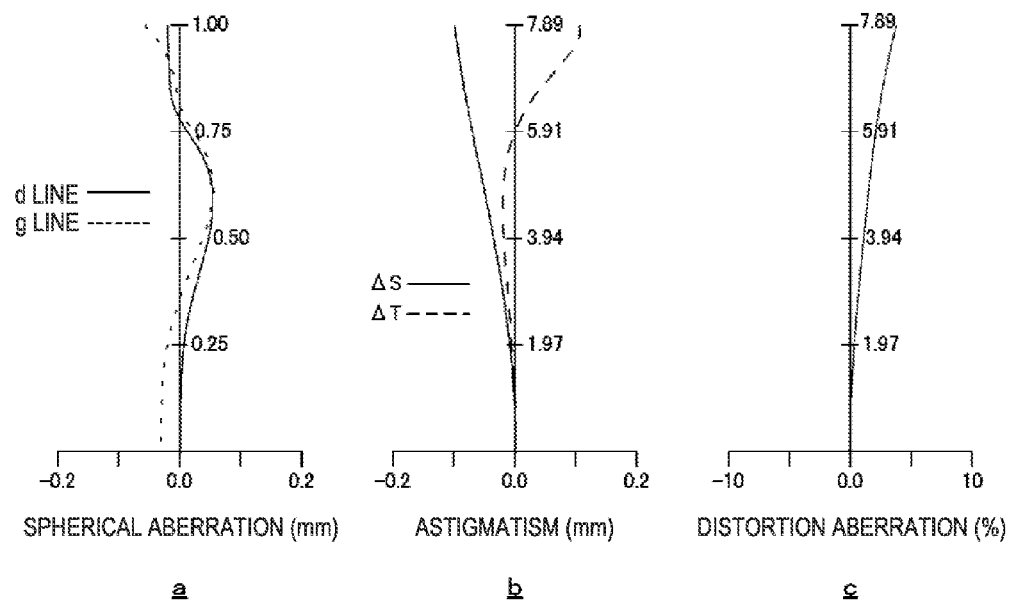

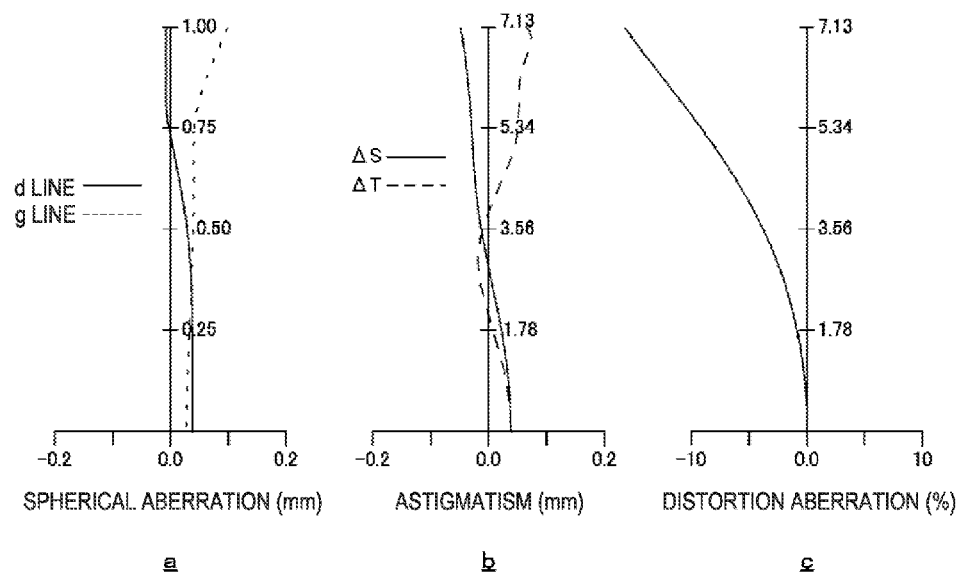
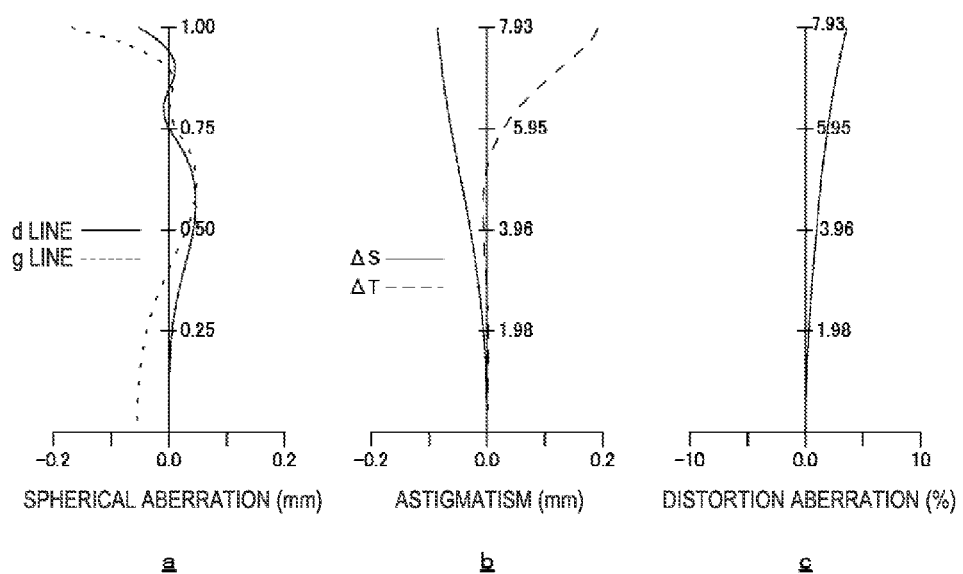

ZOOM LENS AND IMAGE CAPTURING APPARATUS

BACKGROUND

The present technology relates to a zoom lens, and specifically, relates to a zoom lens which has high optical performance over the whole zoom range even in image capturing of the subject at a short distance and is suitable for a digital still camera, a video camera, a monitoring camera and the like and an image capturing apparatus using the zoom lens.

The market of digital still cameras is growing exceedingly in recent years and users' requests for the digital still cameras are being diversified. The requests are exceedingly spreading for higher magnifications of camera lenses, F values for brighter lenses, compatibility with macro functions that enable image capturing of closer-distance subjects, in recent years, and needless to say, being high in image quality and small in dimensions. Generally, many zoom lenses targeting to be small in dimensions and high in magnification employ a system in which only one lens group moves for focusing and the focusing is performed by moving that focus lens group in the optical axis. In particular, a zoom lens for quick focusing, reduced load on actuators, and further, a small focus unit expects lens groups light in weight which are driven. Therefore, optical systems such as so-called inner focusing one and rear focusing one are well known which facilitate focus lenses to be small in dimensions and light in weight relatively readily (for example, see: Japanese Patent Laid-Open No. 2006-301474).

SUMMARY

In case of the optical system in the above-mentioned focusing manner, arranging a focus lens group at a closer position to the image in the optical system improves correction of field curvature aberration and coma aberration. Due to this, field curvature aberration and coma aberration largely arise in focusing and often accompany deterioration of image quality in image capturing of the subject at a short distance. In particular, a zoom lens at a telescopic position which lens has a long practical focal length which is liable to cause large image magnification in its optical system and an optical system which a large-scale sensor is built in expect a large focus lens movement amount in focusing from a distant view to a short distance subject, this enhancing such tendency to a quite significant extent. Furthermore, an optical system with an F value for being bright and a shallow depth of focus significantly causes deterioration of image quality.

It is desirable to attain high optical performance over the whole zoom range even in image capturing of the subject at a short distance using an optical system with high magnification having an F value for being bright or an optical system which a large-scale sensor is built in. Incidentally, examples of such a large-scale sensor can include, for example, sizes of 1/1.7, 2/3, 1.0, APS, 35 mm and the like.

According to a first aspect of the present technology, there is provided a zoom lens including a first focus lens group having negative refractive power and moving in orientation to an image side along an optical axis in focusing from a long distance to a short distance, and a second focus lens group having positive refractive power, the second focus lens group being arranged on a closer side to an image relative to the first focus lens group and moving along the optical axis in focusing. The first and second focus lens groups move in association with each other. Thereby, the first focus lens group and second focus lens group can be associated with each other, allowed to perform aberration correction.

Further, according to the first aspect of the present technology, the second focus lens group may move in orientation to the image side along the optical axis in focusing from the long distance to the short distance. Thereby, the first and second focus lens groups can be moved in orientation to the image side along the optical axis, allowed to perform aberration correction.

Further, according to the first aspect of the present technology, the first and second focus lens groups may satisfy the following conditional expressions (a) to (d), $$(1-\beta_{AW}^2) \times (\beta_{Bihind\_AW})^2 < 0 \quad \text{conditional expression (a)}$$

$$(1-\beta_{AT}^2) \times (\beta_{Bihind\_AT})^2 < 0 \quad \text{conditional expression (b)}$$

$$(1-\beta_{BW}^2) \times (\beta_{Bihind\_BW})^2 < 0 \quad \text{conditional expression (c)}$$

$$(1-\beta_{BT}^2) \times (\beta_{Bihind\_BT})^2 < 0 \quad \text{conditional expression (d)}$$

where $\beta_{AW}$: lateral magnification of the first focus lens group at a wide-angle end, $\beta_{Bihind\_AW}$: lateral magnification of an optical system on the closer side to the image relative to the first focus lens group at a wide-angle end, $\beta_{AT}$: lateral magnification of the first focus lens group at a telescopic end, $\beta_{Bihind\_AT}$: lateral magnification of the optical system on the closer side to the image relative to the first focus lens group at a telescopic end, $\beta_{BW}$: lateral magnification of the second focus lens group at a wide-angle end, $\beta_{Bihind\_BW}$: lateral magnification of an optical system on a closer side to the image relative to the second focus lens group at a wide-angle end, $\beta_{BT}$: lateral magnification of the second focus lens group at a telescopic end, and $\beta_{Bihind\_BT}$: lateral magnification of the optical system on the closer side to the image relative to the second focus lens group at a telescopic end.

Further, according to the first aspect of the present technology, relative relationship between lens movement distances of the first and second focus lens groups in focusing may change per zoom position. The reason is that it is effective to change the relative relationship between the lens movement distances in response to relationship between variation amounts which changes as the zoom position changes.

Further, according to the first aspect of the present technology, lens movement distances of the first and second focus lens groups in focusing may meet linearity for each other. Thereby, actuator control for driving the focus lenses and lens barrel design in relation to driving the focus lenses can be made simple.

Further, according to the first aspect of the present technology, the lens movement distances of the first and second focus lens groups in focusing may satisfy the following conditional expressions (e) and (f), $$0 \leq D_{BW}/D_{AW} < 1.0 \quad \text{conditional expression (e)}$$

$$0.5 \leq D_{BT}/D_{AT} < 1.5 \quad \text{conditional expression (f)}$$

where $D_{AW}$: lens movement distance of the first focus lens group in focusing at a wide-angle end, $D_{BW}$: lens movement distance of the second focus lens group in focusing at a wide-angle end, $D_{AT}$: lens movement distance of the first focus lens group in focusing at a telescopic end, and $D_{BT}$: lens movement distance of the second focus lens group in focusing at a telescopic end.

Further, according to the first aspect of the present technology, the first focus lens group may be constituted of only one negative lens. Thereby, the lens groups which are driven can be small in dimensions and light in weight.

Further, according to the first aspect of the present technology, the second focus lens group may be constituted of only one positive lens. Thereby, the lens groups which are driven can be small in dimensions and light in weight.

Further, according to the first aspect of the present technology, the first and second focus lens groups may be sequentially arranged alongside on a closest side to the image in an optical system. Thereby, the lens barrel can be small in dimensions.

Further, according to the first aspect of the present technology, the zoom lens may include a first zoom lens group having positive refractive power, a second zoom lens group having negative refractive power, a third zoom lens group having positive refractive power, and a fourth zoom lens group having positive refractive power, these groups arranged in order from an object side. The first focus lens group may be a negative lens arranged on a closest side to the image in the third zoom lens group. The second focus lens group may be a positive lens constituting the fourth zoom lens group.

According to the first aspect of the present technology, the zoom lens may include a first zoom lens group having positive refractive power, a second zoom lens group having negative refractive power, a third zoom lens group having positive refractive power, a fourth zoom lens group having negative refractive power, and a fifth zoom lens group having positive refractive power, these groups arranged in order from an object side. The first focus lens group may be a negative lens constituting the fourth zoom lens group. The second focus lens group may be a positive lens constituting the fifth zoom lens group.

Further, according to a second aspect of the present technology, there is provided an image capturing apparatus including a zoom lens including a first focus lens group having negative refractive power and moving in orientation to an image side along an optical axis in focusing from a long distance to a short distance, and a second focus lens group having positive refractive power, arranged on a closer side to an image relative to the first focus lens group and moving along the optical axis in focusing, and an image sensor converting an optical image formed by the zoom lens into an electric signal. The first and second focus lens groups moves in association with each other. Thereby, in the zoom lens of the image capturing apparatus, the first focus lens group and second focus lens group can be associated with each other, allowed to perform aberration correction.

According to embodiments of the present technology, high optical performance can be attained over the whole zoom range even in image capturing of the subject at a short distance using an optical system with high magnification having an F value for being bright or an optical system which a large-scale sensor is built in.

BRIEF DESCRIPTION OF THE DRAWINGS

FIG. 9 is aberration diagrams of the zoom lens according to the second embodiment of the present technology at the wide-angle end at close focus;

FIG. 10 is aberration diagrams of the zoom lens according to the second embodiment of the present technology at the telescopic end at close focus;

FIG. 12 is aberration diagrams of a zoom lens according to the third embodiment of the present technology at the wide-angle end at infinity focus;

FIG. 13 is aberration diagrams of the zoom lens according to the third embodiment of the present technology at the telescopic end at infinity focus;

FIG. 22 is aberration diagrams of a zoom lens according to the fifth embodiment of the present technology at the wide-angle end at infinity focus;

FIG. 23 is aberration diagrams of the zoom lens according to the fifth embodiment of the present technology at the telescopic end at infinity focus;

DETAILED DESCRIPTION OF THE EMBODIMENTS

Figure 1:
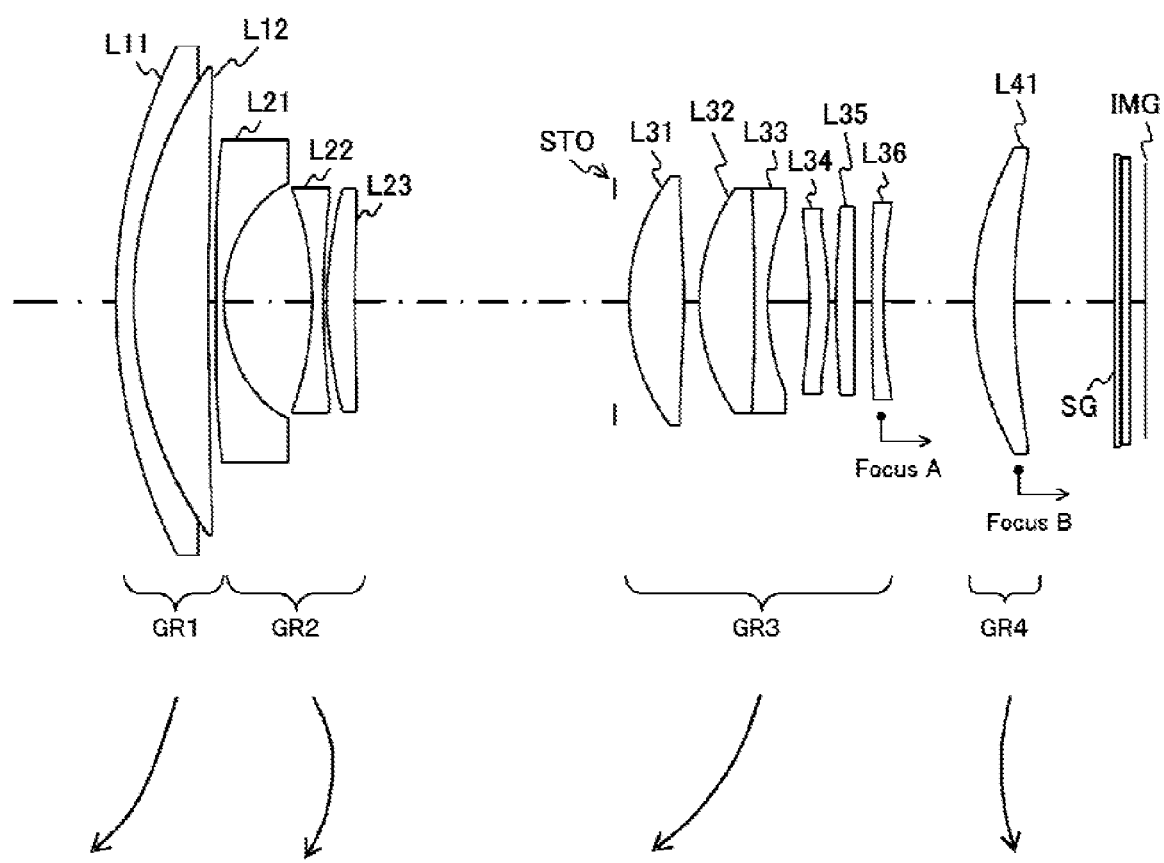
FIG. 1 is a diagram illustrating a lens configuration of a zoom lens according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A zoom lens according to an embodiment of the present disclosure includes a focus lens group A having negative refractive power and moving in orientation to the image side along the optical axis in focusing from a long distance to a short distance. Moreover, the focus lens group A satisfies the following conditional expressions (a) and (b):

$$(1-\beta_{AW}^2) \times (\beta_{Bihind\_AW})^2 < 0 \quad \text{conditional expression (a)}$$

$$(1-\beta_{AT}^2) \times (\beta_{Bihind\_AT})^2 < 0 \quad \text{conditional expression (b)}$$

where $\beta_{AW}$: lateral magnification of the focus lens group A at the wide-angle end, $\beta_{Bihind\_AW}$: lateral magnification of an optical system on a closer side to the image relative to the focus lens group A at the wide-angle end, $\beta_{AT}$: lateral magnification of the focus lens group A at the telescopic end, and $\beta_{Bihind\_AT}$: lateral magnification of the optical system on the closer side to the image relative to the focus lens group A at the telescopic end.

The zoom lens according to the embodiment of the present disclosure that has such a focus configuration leads to a merit that room for its movement in focusing can be easy to be secured in the optical system.

Moreover, the conditional expressions (a) and (b) are expressions for defining focus sensitivities of the focus lens group A at the wide-angle end and at the telescopic end, respectively. Each of these expressions indicates that the focus lens group A moves to the image side, and thereby, plays a role of focusing from a long distance to a short distance. When excess over the upper limit in any of the conditional expressions (a) and (b) takes place to be a numerical value of 0 or more, it is difficult for the focus lens group A to move to the image side, and thereby, to focus from a long distance to a short distance.

Moreover, the zoom lens according to the embodiment of the present disclosure is still preferable further to satisfy the following conditional expressions (a') and (b'):

$$-0.5 < (1-\beta_{AW}^2) \times (\beta_{Bihind\_AW})^2 < -0.3 \quad \text{conditional expression (a')}$$

$$-1.5 < (1-\beta_{AT}^2) \times (\beta_{Bihind\_AT})^2 < -0.5 \quad \text{conditional expression (b')}$$

Satisfying the conditional expressions (a') and (b') enables to take advantage of the merit of the above-mentioned lens configuration at its maximum. When excess over the upper limit in any of the conditional expressions (a') and (b') takes place to be too large, a movement stroke expected for focusing of the focus lens group A is too long, this causing the optical system to be large or the minimum focusing distance for the camera to be sufficiently short for close-up. On the other hand, when shortage to the lower limit therein takes place to be too small, the refractive power of the focus lens group A is strong, causing too much aberration to arise, and thus, a risk of deterioration of image quality.

The zoom lens according to the embodiment of the present disclosure includes a focus lens group B having positive refractive power and moving along the optical axis in focusing, the group arranged at a position on the image side relative to the focus lens group A. Furthermore, the zoom lens employs a floating focus system in which the focus lens groups A and B move in association with each other.

Such a configuration enables the focus lens group B to correct aberrations (for example, spherical aberration, field curvature aberration and coma aberration) arising in focusing of the focus lens group A, this enabling high image quality in focusing on the subject at a short distance to be attained.

Moreover, the focus lens group B satisfies the following conditional expressions (c) and (d):

$$(1-\beta_{BW}^2) \times (\beta_{Bihind\_BW})^2 < 0 \quad \text{conditional expression (c)}$$

$$(1-\beta_{BT}^2) \times (\beta_{Bihind\_BT})^2 < 0 \quad \text{conditional expression (d)}$$

where $\beta_{BW}$: lateral magnification of the focus lens group B at the wide-angle end, $\beta_{Bihind\_BW}$: lateral magnification of an optical system on a closer side to the image relative to the focus lens group B at the wide-angle end, $\beta_{BT}$: lateral magnification of the focus lens group B at the telescopic end, and $\beta_{Bihind\_BT}$: lateral magnification of the optical system on the closer side to the image relative to the focus lens group B at the telescopic end.

The conditional expressions (c) and (d) are expressions for defining focus sensitivities of the focus lens group B at the wide-angle end and at the telescopic end, respectively. Although the focus lens group B is to perform focusing by going forward to a close subject by nature, the expressions define its lens movement of going backward on purpose. When shortage to the lower limit in any of the conditional expressions (c) and (d) takes place to be a numerical value of 0 or less, the sing of its focus sensitivity is equal to the sign of that of the focus lens group A, this causing the focus lens group B to be difficult to favorably correct aberrations arising in focusing of the focus lens group A.

Moreover, the zoom lens according to the embodiment of the present disclosure is still favorable further to satisfy the following conditional expressions (c') and (d'), and in addition, to be configured to move in orientation to the image side along the optical axis in focusing from a long distance to a short distance:

$$0.25 < (1-\beta_{BW}^2) \times (\beta_{Bihind\_BW})^2 < 0.5 \quad \text{conditional expression (c')}$$

$$0.25 < (1-\beta_{BT}^2) \times (\beta_{Bihind\_BT})^2 < 0.5 \quad \text{conditional expression (d')}$$

Moving the focus lens group B in the same orientation as to the focus lens group A in focusing as mentioned above enables to correct aberrations arising in focusing of the focus lens group A (in particular, field curvature aberration and coma aberration) in the reverse direction to that in arising, this allowing favorable image quality also in image capturing of the subject at a short distance.

Moreover, satisfying the conditional expressions (c') and (d') at the same time enables to take advantage of the merit of the above-mentioned lens configuration at its maximum. When shortage to the lower limit in any of the conditional expressions (c') and (d') takes place to be too small, the movement stroke expected for focusing of the focus lens group B is too long, this causing the optical system to be large or the minimum focusing distance for the camera to be difficult to be sufficiently short for close-up. On the other hand, when excess over the upper limit therein takes place to be too small, the refractive power of the focus lens group B is strong, causing too much aberration to arise, and thus, a risk of deterioration of image quality.

In the zoom lens according to the embodiment of the present disclosure, relative relationship between lens movement distances of the focus lens groups A and B in focusing changes at each zoom position. Moreover, the lens movement distances of the focus lens groups A and B in focusing meet linearity for both of them at each zoom position, and is configured to satisfy the following conditional expressions (e) and (f):

$$0 \leq D_{BW}/D_{AW} < 1.0 \quad \text{conditional expression (e)}$$

$$0.5 < D_{BT}/D_{AT} < 1.5 \quad \text{conditional expression (f)}$$

where $D_{AW}$: lens movement distance of the focus lens group A in focusing at the wide-angle end, $D_{BW}$: lens movement distance of the focus lens group B in focusing at the wide-angle end, $D_{AT}$: lens movement distance of the focus lens group A in focusing at the telescopic end, and $D_{BT}$: lens movement distance of the focus lens group B in focusing at the telescopic end.

Changing relative relationship between movement amounts of the focus lens groups A and B in focusing at each zoom position allows effects for aberration correction due to the floating focus to be optimized at each zoom position, this eventually enabling high image quality over the whole zoom range and the whole focus distance.

Furthermore, configuring lens movement distances of the focus lens groups A and B in focusing to meet linearity for both of them at each zoom position enables lens barrel design and actuator control for driving the focus lenses to be simple, this enabling unevenness in performance arising in mass-production of cameras to be reduced.

Moreover, the conditional expressions (e) and (f) are expressions for defining movement distance ratios of the focus lens group B relative to the focus lens group A at the wide-angle end and at the telescopic end, respectively. When excess over the upper limit in any of the conditional expressions (e) and (f) takes place to be too large, the movement amount of the focus lens group B relative to the focus lens group A is too large, this causing the optical system to be large for securing the movement stroke or causing the movement stroke to be short, and thus, the minimum focusing distance for the camera to be difficult to be efficiently short for close-up. On the other hand, when shortage to the lower limit in the conditional expression (e) takes place to be a negative numerical value, the movement directions of the focus lens group A and focus lens group B are converse to each other, this causing appropriate aberration correction in focusing due to the floating focus as mentioned above to be difficult. When shortage to the lower limit in the conditional expression (f) takes place to be too small, a risk of difficulty in sufficiently taking advantage of effects for aberration correction due to the focus lens group B in the floating focus can arise.

Moreover, the zoom lens according to the embodiment of the present disclosure is still preferable to satisfy the following conditional expressions (e') and (f'):

$$0 \leq D_{BW}/D_{AW} < 0.75 \quad \text{conditional expression (e')}$$

$$0.85 < D_{BT}/D_{AT} < 1.35 \quad \text{conditional expression (f')}$$

Satisfying the conditional expressions (e') and (f') enables relationship between relative movement amounts in the floating focus as mentioned above to be more appropriate, eventually enabling to take advantage of effects for aberration correction at their most.

The zoom lens according to the embodiment of the present disclosure includes the focus lens groups A and B in the optical system each of which is configured of one lens. Thereby, the lens groups which are driven can be small in dimensions and light in weight, this enabling load on the actuators to be reduced, and in addition, focus speed and focus accuracy to be improved.

The zoom lens according to the embodiment of the present disclosure includes the focus lens groups A and B in the optical system which are sequentially arranged alongside on the closest side to the image in the optical system. Thereby, for example, compared with an optical system of focusing with a lens arranged on the closer side to the object relative to the F value determining member (aperture stop), the lens used for focusing can be easier to be small in dimensions in view of optical designing. Therefore, the configuration of the focus lens groups can be as simpler as possible to be small in dimensions and light in weight, additionally enabling the actuators driving them and the lens barrel structure to be small in dimensions at the same time. Eventually, the lens barrel can be small in dimensions.

According to an embodiment of the present technology, the zoom lens further includes, in order from an object side, a first zoom lens group having positive refractive power, a second zoom lens group having negative refractive power, a third zoom lens group having positive refractive power, and a fourth zoom lens group having positive refractive power. The focus lens group A is a negative lens arranged on a closest side to the image in the third zoom lens group. The focus lens group B is a positive lens included in the fourth zoom lens group.

According to an embodiment of the present technology, the zoom lens further includes, in order from an object side, a first zoom lens group having positive refractive power, a second zoom lens group having negative refractive power, a third zoom lens group having positive refractive power, a fourth zoom lens group having negative refractive power, and a fifth zoom lens group having positive refractive power. The focus lens group A is a negative lens included in the fourth zoom lens group. The focus lens group B is a positive lens included in the fifth zoom lens group.

Employing such zooming configuration and focusing configuration can attain to be small in dimensions and high in magnification, further enabling the F value to be sufficient for being bright. Furthermore, sufficiently taking advantage of the above-mentioned effects of the floating focus can provide a zoom lens high in image quality attaining excellent aberration correction over the whole zoom range and over the whole focus range from a distant view to a short distance for image capturing.

Hereinafter, preferred embodiments of the present disclosure will be described. The description is made in the following order.

1. First Embodiment (Example 1 of Numerical Values)
2. Second Embodiment (Example 2 of Numerical Values)
3. Third Embodiment (Example 3 of Numerical Values)
4. Fourth Embodiment (Example 4 of Numerical Values)
5. Fifth Embodiment (Example 5 of Numerical Values)
6. Application Example (Image Capturing Apparatus)

Signs and the like used in the following tables and descriptions mean as follows. Namely, the sign "si" denotes the surface number meaning the ith surface from the object side. The sign "ri" denotes the curvature radius of the ith surface from the object side. The sign "di" denotes the spacing between the ith surface and the (i+1)th surface from the object side along the axis. The sign "ni" denotes the refractive index of the glass material having the ith surface on its object side which index is to the d lines (wavelength of 587.6 nm). The sign "vi" denotes the Abbe number of the glass material having the ith surface on its object side which number is to the d lines. Incidentally, regarding the curvature radius, the sign "INFINITY" indicates that the relevant surface is planar. Moreover, the sign "ASP" attached to the surface number indicates that the relevant surface is non-spherical. Moreover, the sign "STO" for the surface number indicates that the relevant surface is an opening aperture stop. Moreover, the sign "f" denotes a focal length. The sign "Fno" denotes an F value (F number). The sign "ω" denotes a half FOV.

Moreover, some zoom lenses used in the individual embodiments have non-spherical lens surfaces. Each of them is supposed to be defined as follows:

$$x = cy^2/(1+(1-(1+\kappa)c^2y^2)^{1/2})$$
$$+A4y^4+A6y^6+A8y^8+A10y^{10}$$

where the sign "x" denotes a distance from the vertex of the lens surface in the optical axis direction (amount of sagging), the sign "y" denotes a height in the direction perpendicular to the optical axis, the sign "c" denotes a paraxial curvature at the lens vertex, and the sign "κ" denotes a conic constant. In addition, the numbers A4, A6, A8 and A10 denote fourth-order, sixth-order, eighth-order and tenth-order non-spherical coefficients.

1. First Embodiment

[Lens Configuration]

FIG. 1 is a diagram illustrating a lens configuration of a zoom lens according to First Embodiment of the present technology. The zoom lens according to First Embodiment includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, a positive lens L35 and a meniscus-shaped negative lens L36 concave to the image side in the order from the object side to the image side.

The fourth zoom lens group GR4 includes a meniscus-shaped positive lens L41 convex to the object side.

An opening aperture stop STO is disposed on the object side of the third zoom lens group GR3. Moreover, a filter SG is disposed between the fourth zoom lens group GR4 and an image plane IMG.

The zoom lens employs the floating focus system in which focus lens groups A and B move in association with each other in focusing, where the focus lens group A corresponds to the negative lens L36 and the focus lens group B corresponds to the positive lens L41. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

[Specifications of Zoom Lens]

Table 1 presents data of the lenses in Example 1 of Numerical Values, in which specific numerical values are applied to the zoom lens according to First Embodiment.

TABLE 1

| s i | r i | d i | n i | ν i |
|---|---|---|---|---|
| 1 | 35.214 | 1.000 | 1.92286 | 20.880 |
| 2 | 24.730 | 4.620 | 1.77250 | 49.624 |
| 3 | 460.000 | (d 3) | | |
| 4 (ASP) | 468.512 | 0.500 | 1.75501 | 51.158 |
| 5 (ASP) | 9.200 | 5.422 | | |
| 6 | −20.000 | 0.750 | 1.72916 | 54.674 |
| 7 | 55.391 | 0.250 | | |
| 8 (ASP) | 20.500 | 1.700 | 2.00170 | 19.324 |
| 9 (ASP) | 86.255 | (d 9) | | |
| STO | INFINITY | 0.800 | | |
| 11 (ASP) | 13.050 | 3.380 | 1.55332 | 71.685 |
| 12 (ASP) | −77.06 | 1.000 | | |
| 13 | 12.120 | 3.430 | 1.59201 | 67.023 |
| 14 | −150.000 | 0.770 | 1.80518 | 25.456 |
| 15 | 14.388 | 2.547 | | |
| 16 (ASP) | −41.297 | 1.220 | 1.72903 | 54.041 |
| 17 (ASP) | −21.580 | 0.500 | | |
| 18 | 77.969 | 1.120 | 1.72916 | 54.674 |
| 19 | −312.042 | (d 19) | | |
| 20 | 151.077 | 0.700 | 1.72916 | 54.674 |
| 21 | 35.396 | (d 21) | | |
| 22 (ASP) | 18.200 | 2.620 | 1.52470 | 56.460 |
| 23 (ASP) | 48.000 | (d 23) | | |
| 24 | INFINITY | 0.300 | 1.51680 | 64.200 |
| 25 | INFINITY | 0.150 | | |
| 26 | INFINITY | 0.500 | 1.51680 | 64.200 |
| 27 | INFINITY | 1.000 | | |
| IMG | INFINITY | | | |

In the zoom lens according to First Embodiment, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L41 of the fourth lens group GR4 (twenty second surface and twenty third surface) are non-spherical. Table 2 presents the conic constants κ and the fourth-order, sixth-order, eighth-order and tenth-order non-spherical coefficients A4, A6, A8 and A10 of these surfaces. In addition, in Table 2 and the following other tables presenting non-spherical coefficients, the expression "E-i" is an exponential expression with a base of 10, that is, represents "$10^{-i}$". For example, the expression "0.12345E-05" represents "$0.12345 \times 10^{-5}$".

TABLE 2

| s i | κ | A4 | A6 | A8 | A10 |
|---|---|---|---|---|---|
| 4 | 0.00000E+00 | 5.68774E−06 | 8.94949E−07 | −8.70987E−09 | 2.31168E−11 |
| 5 | 4.98194E−01 | −1.50205E−04 | −1.98376E−07 | 1.80380E−08 | −4.16711E−10 |
| 8 | 0.00000E+00 | −1.61090E−04 | 1.30703E−06 | −6.58162E−08 | 1.47137E−09 |
| 9 | 0.00000E+00 | −1.12266E−04 | 1.08417E−06 | −7.49574E−08 | 1.47894E−09 |
| 11 | 0.00000E+00 | −1.13976E−06 | 5.69912E−07 | −4.23240E−09 | 0.00000E+00 |
| 12 | 0.00000E+00 | 5.53452E−05 | 6.07857E−07 | −8.21684E−08 | 0.00000E+00 |
| 16 | 0.00000E+00 | −1.34309E−04 | 8.36085E−06 | −3.07464E−08 | 0.00000E+00 |
| 17 | −2.15800E+01 | −1.00000E+01 | −9.35952E−05 | 9.86885E−06 | −2.66219E−08 |
| 22 | −3.11324E−01 | 3.76073E−05 | −1.57738E−06 | 3.04430E−08 | −1.89579E−10 |
| 23 | −1.00000E+01 | 6.45328E−05 | −2.99249E−06 | 5.18262E−08 | −3.12112E−10 |

Table 3 presents the focal lengths f, F values Fno and half FOVs ω at the wide-angle end, at the intermediate focal length and at the telescopic end in Example 1 of Numerical Values.

TABLE 3

| | Wide-Angle End | Intermediate Focal Length | Telescopic End |
|---|---|---|---|
| f | 9.58 | 19.82 | 41.00 |
| Fno | 1.87 | 2.49 | 3.30 |
| ω | 41.41 | 21.75 | 10.56 |

In the zoom lens according to First Embodiment, in zooming between the wide-angle end and telescopic end in the normal mode, a spacing d3 between the first lens group GR1 and second lens group GR2, a spacing d9 between the second lens group GR2 and third lens group GR3, a spacing d19 between the positive lens L35 and negative lens L36, a spacing d21 between the third lens group GR3 and fourth lens group GR4 and a spacing d23 between the fourth lens group GR4 and filter SG vary, where the subject distance is infinity. Table 4 presents the variable spacings with respect to the respective spacings at the wide-angle end, at the intermediate focal length and at the telescopic end in this case.

TABLE 4

| (Infinity) | Wide-Angle End | Intermediate Focal Length | Telescopic End |
|---|---|---|---|
| Subject Distance | Infinity | Infinity | Infinity |
| d 3 | 0.500 | 9.601 | 18.240 |
| d 9 | 16.030 | 6.684 | 2.600 |
| d 19 | 1.100 | 1.100 | 1.100 |
| d 21 | 5.500 | 7.686 | 22.843 |
| d 23 | 6.143 | 10.669 | 5.800 |

Moreover, in the zoom lens according to First Embodiment, in zooming between the wide-angle end and telescopic end, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 5 presents the variable spacings with respect to the respective spacings at the wide-angle end, at the intermediate focal length and at the telescopic end in this case.

TABLE 5

| (Close) | Wide-Angle End | Intermediate Focal Length | Telescopic End |
|---|---|---|---|
| Subject Distance | 50 mm | 200 mm | 800 mm |
| d 19 | 4.856 | 4.404 | 4.675 |
| d 21 | 1.744 | 4.382 | 23.290 |
| d 23 | 6.143 | 10.669 | 1.778 |

[Aberration of Zoom Lens]

Figure 2:
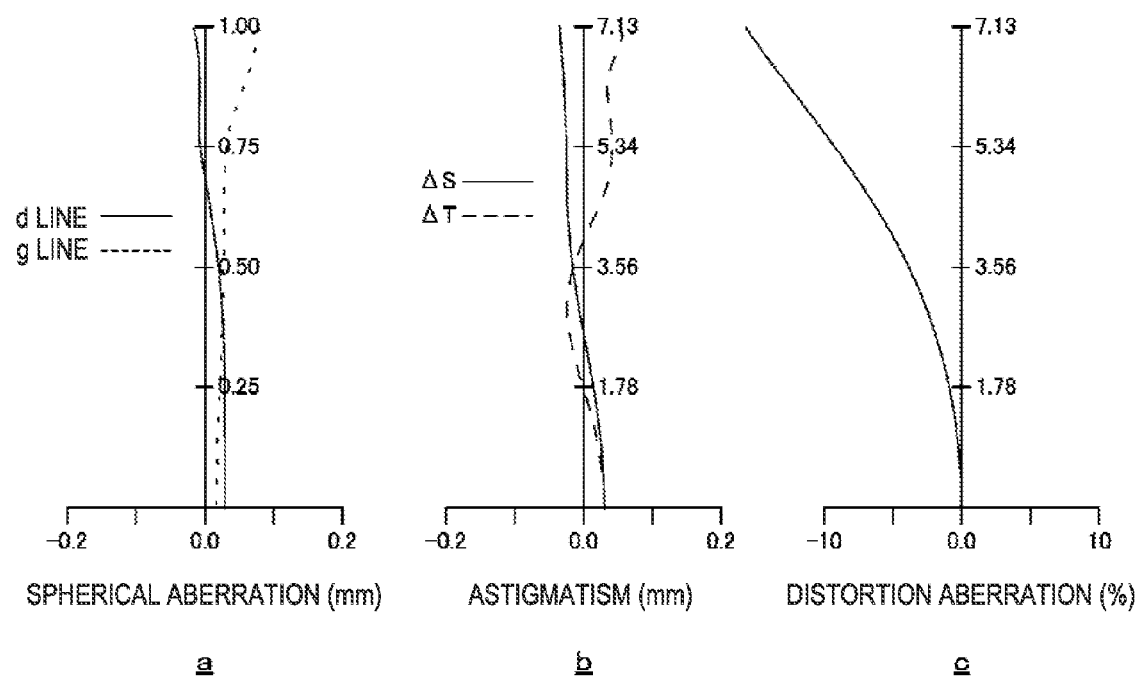
FIG. 2 is aberration diagrams of a zoom lens according to the first embodiment of the present technology at the wide-angle end at infinity focus.
Figure 3:
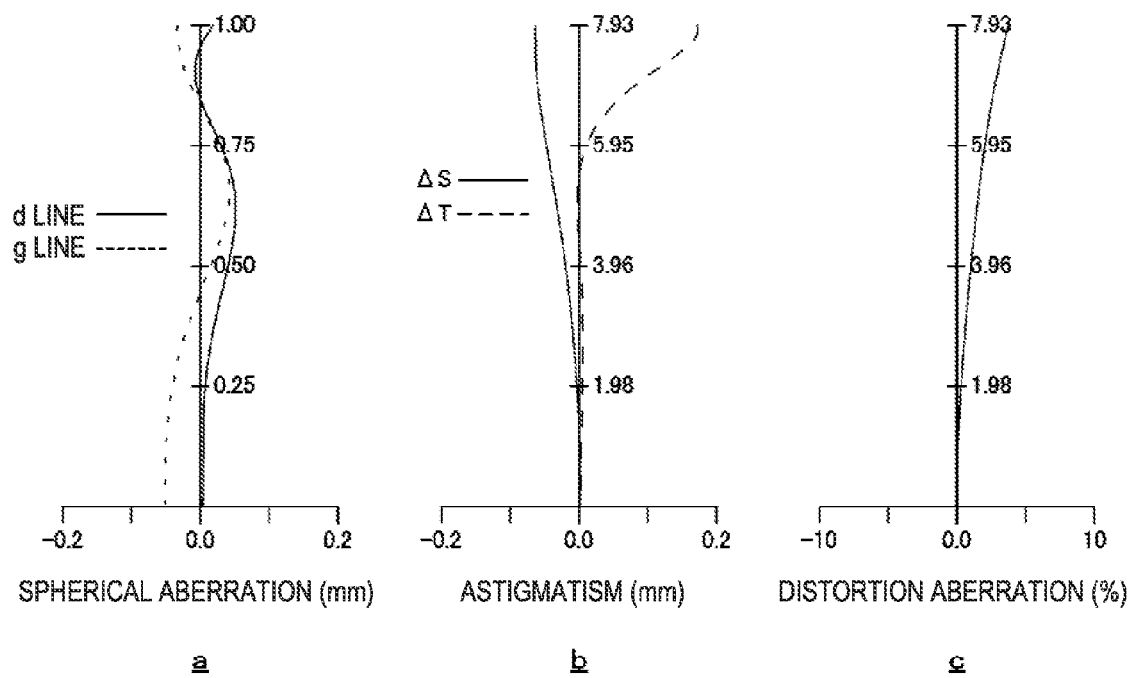
FIG. 3 is aberration diagrams of the zoom lens according to the first embodiment of the present technology at the telescopic end at infinity focus.

FIGS. 2 and 3 illustrate aberration diagrams of the zoom lens according to First Embodiment of the present technology at infinity focus. FIG. 2 and FIG. 3 illustrate aberration diagrams at the wide-angle end and at the telescopic end, respectively. Portions a, portions b and portions c in these figures illustrate spherical aberration diagrams, astigmatism diagrams (field curvature diagrams) and distortion aberration diagrams, respectively.

Figure 4:
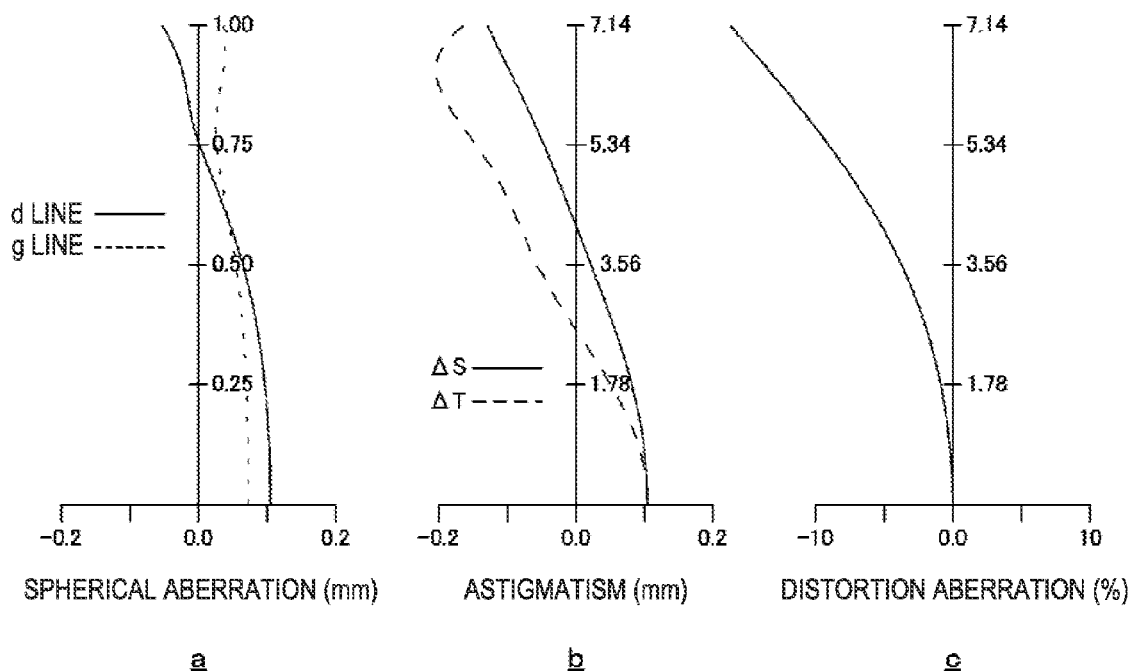
FIG. 4 is aberration diagrams of the zoom lens according to the first embodiment of the present technology at the wide-angle end at close focus.
Figure 5:
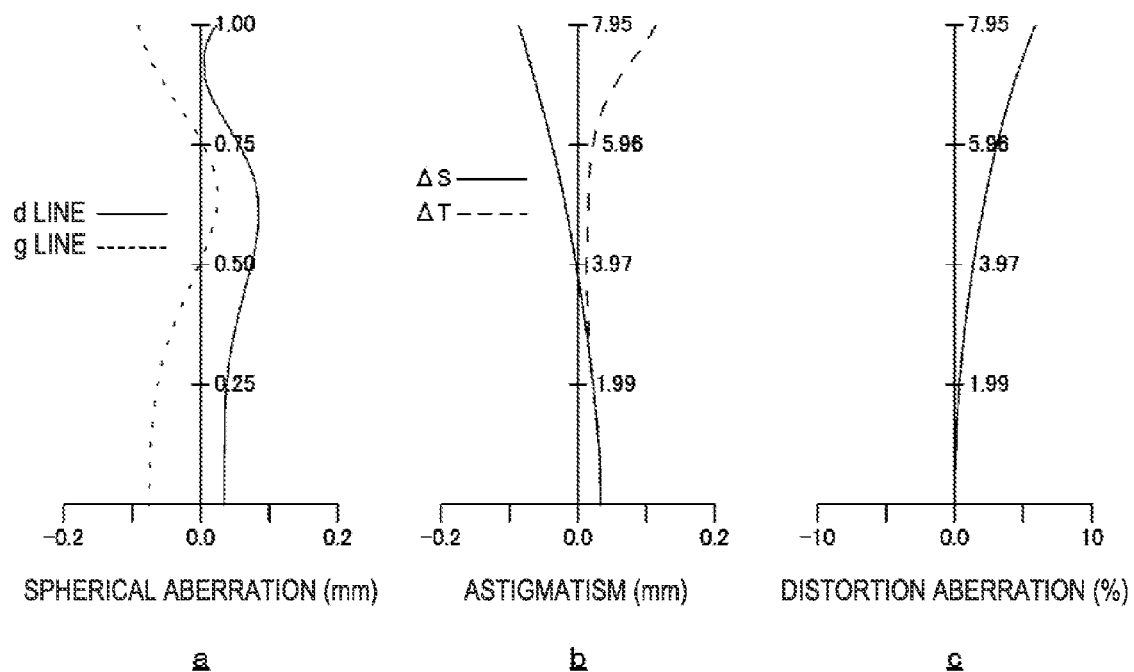
FIG. 5 is aberration diagrams of the zoom lens according to the first embodiment of the present technology at the telescopic end at close focus.

FIGS. 4 and 5 illustrate aberration diagrams of the zoom lens according to First Embodiment of the present technology at close focus. FIG. 4 and FIG. 5 illustrate aberration diagrams at the wide-angle end and at the telescopic end, respectively. Similarly, portions a, portions b and portions c in these figures illustrate spherical aberration diagrams, astigmatism diagrams (field curvature diagrams) and distortion aberration diagrams, respectively.

In addition, in these spherical aberration diagrams and the following spherical aberration diagrams, the solid lines and broken lines indicate values for the d lines (587.6 nm) and g lines (wavelength of 435.8 nm), respectively. Moreover, in these astigmatism diagrams and the following astigmatism diagrams, the solid lines and broken lines indicate values for the sagittal image surfaces and meridional image surfaces.

It is apparent from the aberration diagrams that Example 1 of Numerical Values attains excellent imaging performance, correcting the aberrations favorably.

2. Second Embodiment

[Lens Configuration]

Figure 6:
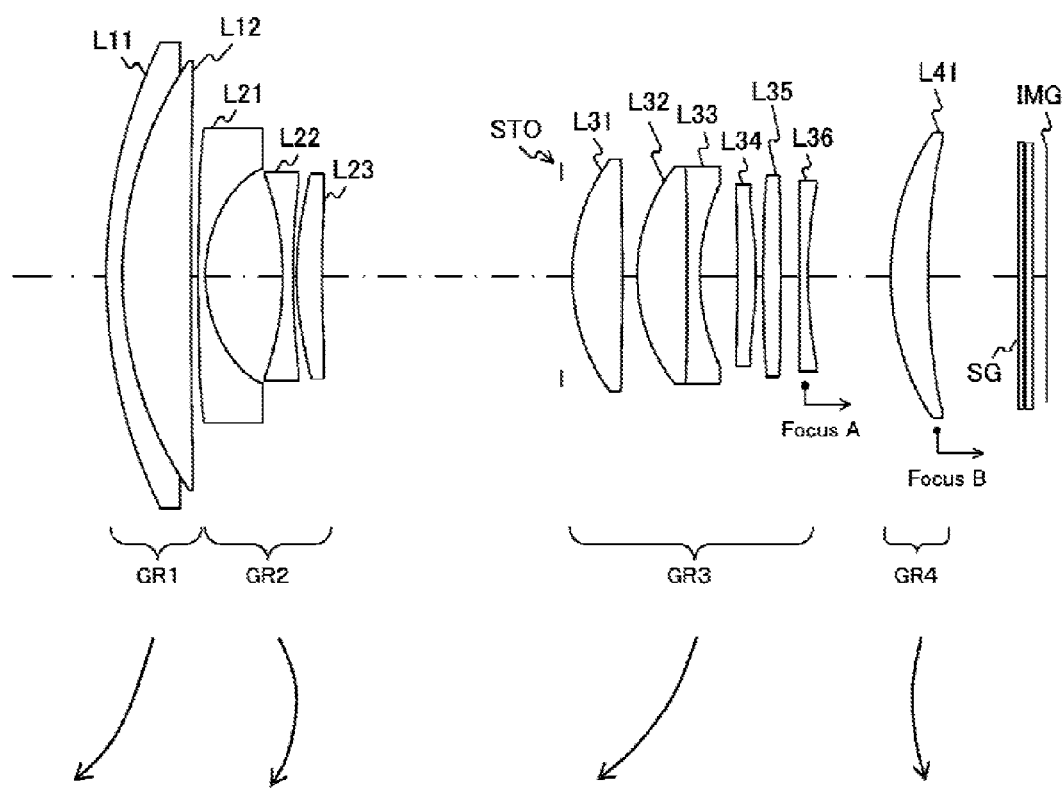
FIG. 6 is a diagram illustrating a lens configuration of a zoom lens according to a second embodiment of the present technology.

FIG. 6 is a diagram illustrating a lens configuration of a zoom lens according to Second Embodiment of the present technology. The zoom lens according to Second Embodiment includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, a positive lens L35 and a meniscus-shaped negative lens L36 concave to the image side in the order from the object side to the image side.

The fourth zoom lens group GR4 includes a meniscus-shaped positive lens L41 convex to the object side.

An opening aperture stop STO is disposed on the object side of the third zoom lens group GR3. Moreover, a filter SG is disposed between the fourth zoom lens group GR4 and an image plane IMG.

The zoom lens employs the floating focus system in which focus lens groups A and B move in association with each other in focusing, where the focus lens group A corresponds to the negative lens L36 and the focus lens group B corresponds to the positive lens L41. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

[Specifications of Zoom Lens]

Table 6 presents data of the lenses in Example 2 of Numerical Values, in which specific numerical values are applied to the zoom lens according to Second Embodiment.

TABLE 6

| s i | r i | d i | n i | v i |
|---|---|---|---|---|
| 1 | 35.292 | 1.000 | 1.92286 | 20.880 |
| 2 | 24.730 | 4.620 | 1.77250 | 49.624 |
| 3 | 460.000 | (d 3) | | |
| 4 (ASP) | 417.077 | 0.500 | 1.75501 | 51.158 |
| 5 (ASP) | 9.236 | 5.210 | | |
| 6 | −20.000 | 0.750 | 1.72916 | 54.674 |
| 7 | 53.460 | 0.250 | | |
| 8 (ASP) | 19.876 | 1.700 | 2.00170 | 19.324 |
| 9 (ASP) | 79.216 | (d 9) | | |
| STO | INFINITY | 0.800 | | |
| 11 (ASP) | 13.353 | 3.380 | 1.55332 | 71.685 |
| 12 (ASP) | −85.00 | 1.000 | | |
| 13 | 12.000 | 3.430 | 1.59201 | 67.023 |
| 14 | −150.000 | 0.770 | 1.80518 | 25.456 |
| 15 | 14.483 | 2.600 | | |
| 16 (ASP) | −54.311 | 1.200 | 1.72903 | 54.041 |
| 17 (ASP) | −22.075 | 0.500 | | |
| 18 | 96.346 | 1.120 | 1.72916 | 54.674 |
| 19 | −204.796 | (d 19) | | |
| 20 | 254.066 | 0.700 | 1.72916 | 54.674 |
| 21 | 35.396 | (d 21) | | |

TABLE 6-continued

| s i | r i | d i | n i | v i |
|---|---|---|---|---|
| 22 (ASP) | 17.900 | 2.650 | 1.52470 | 56.460 |
| 23 (ASP) | 50.314 | (d 23) | | |
| 24 | INFINITY | 0.300 | 1.51680 | 64.200 |
| 25 | INFINITY | 0.150 | | |
| 26 | INFINITY | 0.500 | 1.51680 | 64.200 |
| 27 | INFINITY | 1.000 | | |
| IMG | INFINITY | | | |

In the zoom lens according to Second Embodiment, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L41 of the fourth lens group GR4 (twenty second surface and twenty third surface) are non-spherical. Table 7 presents the conic constants κ and the fourth-order, sixth-order, eighth-order and tenth-order non-spherical coefficients A4, A6, A8 and A10 of these surfaces.

TABLE 7

| s i | κ | A4 | A6 | A8 | A10 |
|---|---|---|---|---|---|
| 4 | 0.00000E+00 | 2.68927E−05 | 4.58592E−07 | −4.96505E−09 | 1.09563E−11 |
| 5 | 5.35382E−01 | −1.35919E−04 | −1.80358E−07 | 1.26895E−08 | −4.71179E−10 |
| 8 | 0.00000E+00 | −1.82882E−04 | 2.57794E−06 | −1.01722E−07 | 1.74029E−09 |
| 9 | 0.00000E+00 | −1.28821E−04 | 2.09141E−06 | −1.02404E−07 | 1.65471E−09 |
| 11 | 0.00000E+00 | −1.02914E−06 | 5.51640E−07 | −4.17771E−09 | 0.00000E+00 |
| 12 | 0.00000E+00 | 5.18094E−05 | 5.79805E−07 | −7.91635E−09 | 0.00000E+00 |
| 16 | 0.00000E+00 | −1.66166E−04 | 7.63647E−06 | −4.89314E−09 | 0.00000E+00 |
| 17 | −1.00000E+01 | −1.18319E−04 | 9.05970E−06 | −6.96278E−09 | 9.36699E−10 |
| 22 | −5.18353E−01 | 4.17851E−05 | −8.46723E−07 | 1.48650E−08 | −5.92557E−11 |
| 23 | −2.86078E+00 | 5.32387E−05 | −2.05218E−06 | 3.23863E−08 | −1.54194E−10 |

Table 8 presents the focal lengths f, F values Fno and half FOVs ω at the wide-angle end, at the intermediate focal length and at the telescopic end in Example 2 of Numerical Values.

TABLE 8

| | Wide-Angle End | Intermediate Focal Length | Telescopic End |
|---|---|---|---|
| f | 9.58 | 19.82 | 41.00 |
| Fno | 1.87 | 2.27 | 3.01 |
| ω | 41.42 | 21.79 | 10.57 |

In the zoom lens according to Second Embodiment, in zooming between the wide-angle end and telescopic end, a spacing d3 between the first lens group GR1 and second lens group GR2, a spacing d9 between the second lens group GR2 and third lens group GR3, a spacing d19 between the positive lens L35 and negative lens L36, a spacing d21 between the third lens group GR3 and fourth lens group GR4 and a spacing d23 between the fourth lens group GR4 and filter SG vary, where the subject distance is infinity. Table 9 presents the variable spacings with respect to the respective spacings at the wide-angle end, at the intermediate focal length and at the telescopic end in this case.

TABLE 9

| (Infinity) | Wide-Angle End | Intermediate Focal Length | Telescopic End |
|---|---|---|---|
| Subject Distance | Infinity | Infinity | Infinity |
| d 3 | 0.500 | 9.621 | 18.326 |
| d 9 | 16.080 | 6.653 | 2.600 |
| d 19 | 1.200 | 1.200 | 1.200 |
| d 21 | 5.497 | 7.743 | 22.708 |
| d 23 | 6.030 | 10.505 | 5.800 |

Moreover, in the zoom lens according to Second Embodiment, in zooming between the wide-angle end and telescopic end, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 10 presents the variable spacings with respect to the respective spacings at the wide-angle end, at the intermediate focal length and at the telescopic end in this case.

TABLE 10

| (Close) | Wide-Angle End | Intermediate Focal Length | Telescopic End |
|---|---|---|---|
| Subject Distance | 50 mm | 200 mm | 800 mm |
| d 19 | 4.499 | 4.096 | 4.336 |
| d 21 | 2.198 | 4.848 | 23.490 |
| d 23 | 6.030 | 10.505 | 1.881 |

[Aberration of Zoom Lens]

Figure 7:
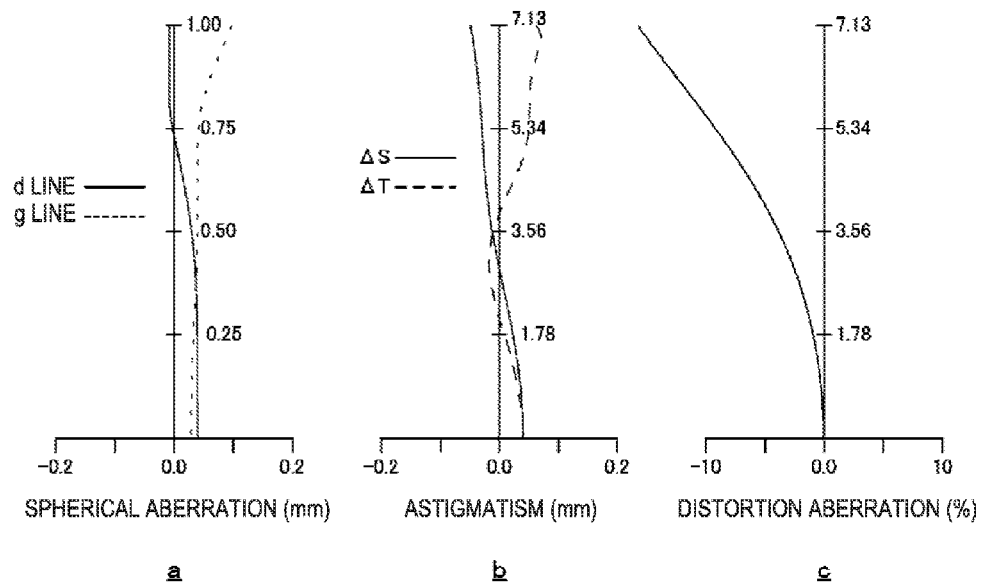
FIG. 7 is aberration diagrams of a zoom lens according to the second embodiment of the present technology at the wide-angle end at infinity focus.
Figure 8:
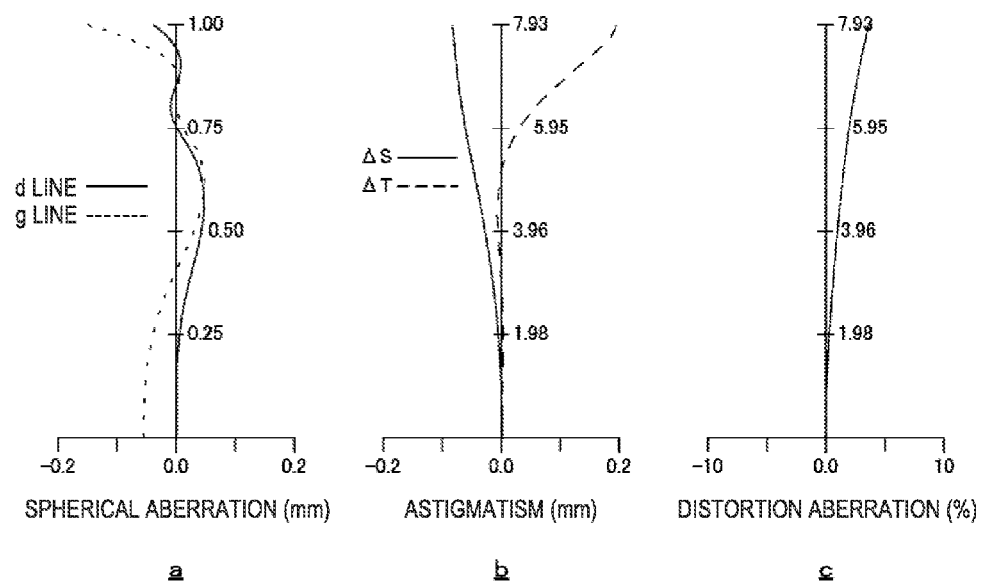
FIG. 8 is aberration diagrams of the zoom lens according to the second embodiment of the present technology at the telescopic end at infinity focus.

FIGS. 7 and 8 illustrate aberration diagrams of the zoom lens according to Second Embodiment of the present technology at infinity focus. FIG. 7 and FIG. 8 illustrate aberration diagrams at the wide-angle end and at the telescopic end, respectively. Portions a, portions b and portions c in these figures illustrate spherical aberration diagrams, astigmatism diagrams (field curvature diagrams) and distortion aberration diagrams, respectively.

FIGS. 9 and 10 illustrate aberration diagrams of the zoom lens according to Second Embodiment of the present technology at close focus. FIG. 9 and FIG. 10 illustrate aberration diagrams at the wide-angle end and at the telescopic end, respectively. Similarly, portions a, portions b and portions c in these figures illustrate spherical aberration diagrams, astigmatism diagrams (field curvature diagrams) and distortion aberration diagrams, respectively.

It is apparent from the aberration diagrams that Example 2 of Numerical Values attains excellent imaging performance, correcting the aberrations favorably.

3. Third Embodiment

[Lens Configuration]

Figure 11:
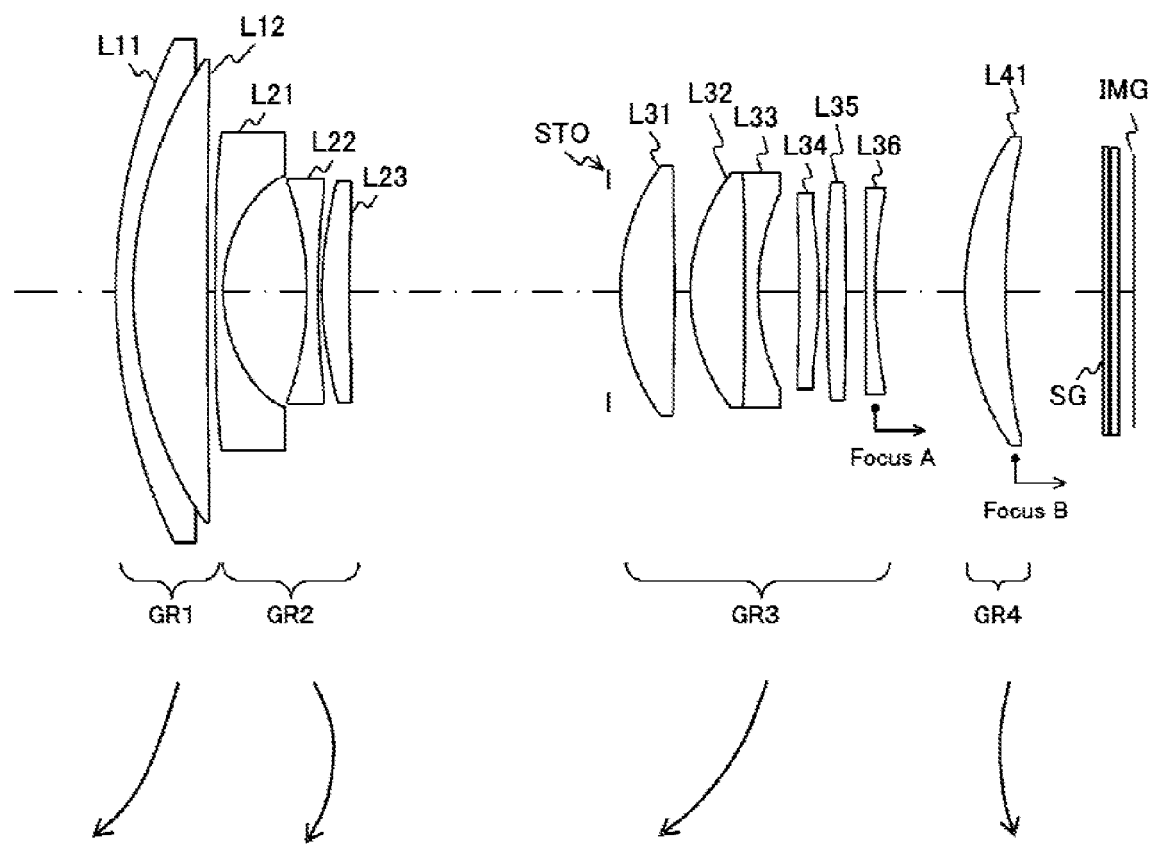
FIG. 11 is a diagram illustrating a lens configuration of a zoom lens according to a third embodiment of the present technology.

FIG. 11 is a diagram illustrating a lens configuration of a zoom lens according to Third Embodiment of the present technology. The zoom lens according to Third Embodiment includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, a positive lens L35 and a meniscus-shaped negative lens L36 concave to the image side in the order from the object side to the image side.

The fourth zoom lens group GR4 includes a meniscus-shaped positive lens L41 convex to the object side.

An opening aperture stop STO is disposed on the object side of the third zoom lens group GR3. Moreover, a filter SG is disposed between the fourth zoom lens group GR4 and an image plane IMG.

The zoom lens employs the floating focus system in which focus lens groups A and B move in association with each other in focusing, where the focus lens group A corresponds to the negative lens L36 and the focus lens group B corresponds to the positive lens L41. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

[Specifications of Zoom Lens]

Table 11 presents data of the lenses in Example 3 of Numerical Values, in which specific numerical values are applied to the zoom lens according to Third Embodiment.

TABLE 11

| s i | r i | d i | n i | v i |
|---|---|---|---|---|
| 1 | 34.966 | 1.000 | 1.92286 | 20.880 |
| 2 | 24.500 | 4.620 | 1.77250 | 49.624 |
| 3 | 610.465 | (d 3) | | |
| 4 (ASP) | 750.000 | 0.500 | 1.75501 | 51.158 |
| 5 (ASP) | 9.233 | 5.551 | | |
| 6 | −20.500 | 0.750 | 1.72916 | 54.674 |
| 7 | 70.000 | 0.250 | | |
| 8 (ASP) | 22.710 | 1.700 | 2.00170 | 19.324 |
| 9 (ASP) | 112.921 | (d 9) | | |
| STO | INFINITY | 0.800 | | |
| 11 (ASP) | 12.820 | 3.380 | 1.55332 | 71.685 |
| 12 (ASP) | −85.00 | 1.000 | | |
| 13 | 12.000 | 3.430 | 1.59201 | 67.023 |
| 14 | −150.000 | 0.800 | 1.80518 | 25.456 |
| 15 | 14.132 | 2.556 | | |
| 16 (ASP) | −26.674 | 1.200 | 1.72903 | 54.041 |
| 17 (ASP) | −18.739 | 0.500 | | |
| 18 | 50.000 | 1.134 | 1.72916 | 54.674 |
| 19 | −380.000 | (d 19) | | |
| 20 | 123.039 | 0.700 | 1.72916 | 54.674 |
| 21 | 35.396 | (d 21) | | |
| 22 (ASP) | 19.054 | 2.416 | 1.52470 | 56.460 |
| 23 (ASP) | 50.000 | (d 23) | | |
| 24 | INFINITY | 0.300 | 1.51680 | 64.200 |
| 25 | INFINITY | 0.150 | | |
| 26 | INFINITY | 0.500 | 1.51680 | 64.200 |
| 27 | INFINITY | 1.000 | | |
| IMG | INFINITY | | | |

In the zoom lens according to Third Embodiment, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L41 of the fourth lens group GR4 (twenty second surface and twenty third surface) are non-spherical. Table 12 presents the conic constants κ and the fourth-order, sixth-order, eighth-order and tenth-order non-spherical coefficients A4, A6, A8 and A10 of these surfaces.

TABLE 12

| s i | κ | A4 | A6 | A8 | A10 |
|---|---|---|---|---|---|
| 4 | 0.00000E+00 | −3.26147E−05 | 1.18902E−06 | −9.36139E−09 | 2.28042E−11 |
| 5 | 4.24825E−01 | −1.70167E−04 | −1.00884E−07 | 5.90646E−09 | −1.94617E−10 |
| 8 | 0.00000E+00 | −1.12903E−04 | 9.59931E−07 | −6.27631E−08 | 1.34451E−09 |
| 9 | 0.00000E+00 | −7.95713E−05 | 9.19520E−07 | −7.11901E−08 | 1.34663E−09 |
| 11 | 0.00000E+00 | −1.67897E−06 | 6.70181E−07 | −5.60053E−09 | 0.00000E+00 |
| 12 | 0.00000E+00 | 5.73134E−05 | 6.19238E−07 | −8.94302E−09 | 0.00000E+00 |
| 16 | 0.00000E+00 | −1.16142E−04 | 8.49835E−06 | −2.16854E−08 | 0.00000E+00 |
| 17 | −1.00000E+01 | −1.38214E−04 | 1.12301E−05 | −4.70735E−08 | 1.42474E−09 |
| 22 | −1.37619E+00 | 8.75576E−05 | −2.66080E−06 | 4.06868E−08 | −2.05393E−10 |
| 23 | −1.00000E+01 | 1.07414E−04 | −4.70700E−06 | 6.96764E−08 | −3.57224E−10 |

Table 13 presents the focal lengths f, F values Fno and half FOVs ω at the wide-angle end, at the intermediate focal length and at the telescopic end in Example 3 of Numerical Values.

TABLE 13

| | Wide-Angle End | Intermediate Focal Length | Telescopic End |
|---|---|---|---|
| f | 9.58 | 18.55 | 35.91 |
| Fno | 1.87 | 2.23 | 2.89 |
| ω | 41.25 | 23.00 | 11.95 |

In the zoom lens according to Third Embodiment, in zooming between the wide-angle end and telescopic end, a spacing d3 between the first lens group GR1 and second lens group GR2, a spacing d9 between the second lens group GR2 and third lens group GR3, a spacing d19 between the positive lens L35 and negative lens L36, a spacing d21 between the third lens group GR3 and fourth lens group GR4 and a spacing d23 between the fourth lens group GR4 and filter SG vary, where the subject distance is infinity. Table 14 presents the variable spacings with respect to the respective spacings at the wide-angle end, at the intermediate focal length and at the telescopic end in this case.

TABLE 14

| (Infinity) | Wide-Angle End | Intermediate Focal Length | Telescopic End |
|---|---|---|---|
| Subject Distance | Infinity | Infinity | Infinity |
| d 3 | 0.500 | 8.520 | 16.100 |
| d 9 | 15.900 | 7.020 | 2.700 |
| d 19 | 1.100 | 1.100 | 1.100 |
| d 21 | 5.354 | 7.580 | 20.227 |
| d 23 | 6.000 | 9.551 | 5.500 |

Moreover, in the zoom lens according to Third Embodiment, in zooming between the wide-angle end and telescopic end, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 15 presents the variable spacings with respect to the respective spacings at the wide-angle end, at the intermediate focal length and at the telescopic end in this case.

TABLE 15

| (Close) | Wide-Angle End | Intermediate Focal Length | Telescopic End |
|---|---|---|---|
| Subject Distance | 50 mm | 200 mm | 800 mm |
| d 19 | 5.312 | 4.356 | 4.445 |

TABLE 15-continued

| (Close) | Wide-Angle End | Intermediate Focal Length | Telescopic End |
|---|---|---|---|
| d 21 | 1.142 | 4.325 | 20.416 |
| d 23 | 6.000 | 9.551 | 1.963 |

[Aberration of Zoom Lens]

FIGS. 12 and 13 illustrate aberration diagrams of the zoom lens according to Third Embodiment of the present technology at infinity focus. FIG. 12 and FIG. 13 illustrate aberration diagrams at the wide-angle end and at the telescopic end, respectively. Portions a, portions b and portions c in these figures illustrate spherical aberration diagrams, astigmatism diagrams (field curvature diagrams) and distortion aberration diagrams, respectively.

Figure 14:
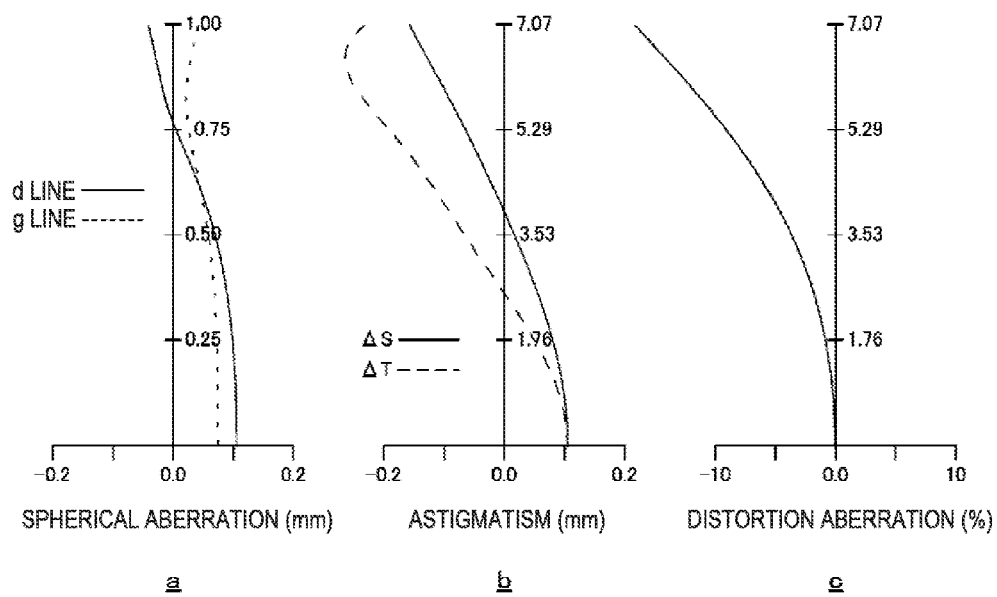
FIG. 14 is aberration diagrams of the zoom lens according to the third embodiment of the present technology at the wide-angle end at close focus.
Figure 15:
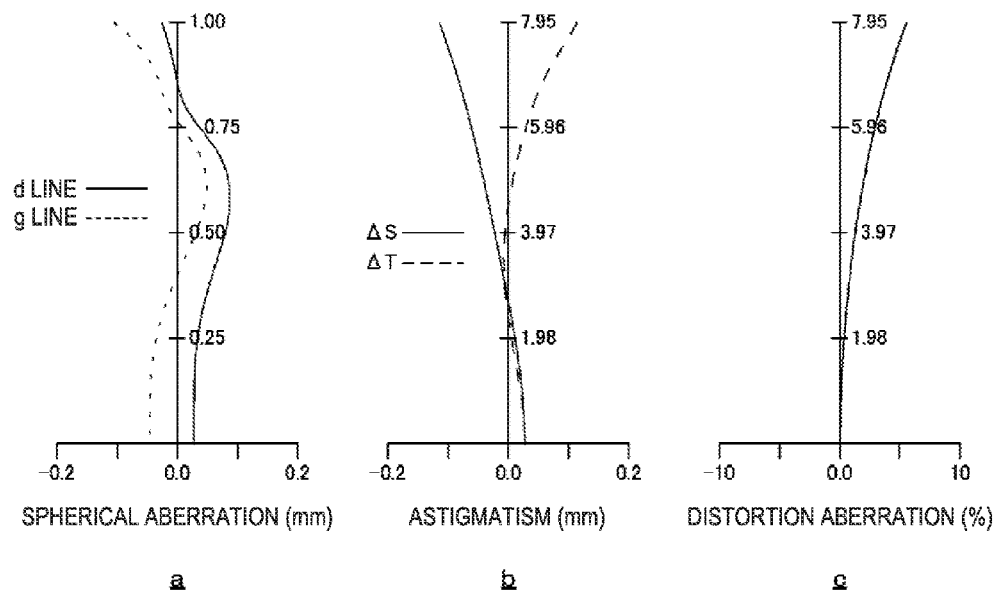
FIG. 15 is aberration diagrams of the zoom lens according to the third embodiment of the present technology at the telescopic end at close focus.

FIGS. 14 and 15 illustrate aberration diagrams of the zoom lens according to Third Embodiment of the present technology at close focus. FIG. 14 and FIG. 15 illustrate aberration diagrams at the wide-angle end and at the telescopic end, respectively. Similarly, portions a, portions b and portions c in these figures illustrate spherical aberration diagrams, astigmatism diagrams (field curvature diagrams) and distortion aberration diagrams, respectively.

It is apparent from the aberration diagrams that Example 3 of Numerical Values attains excellent imaging performance, correcting the aberrations favorably.

4. Fourth Embodiment

[Lens Configuration]

Figure 16:
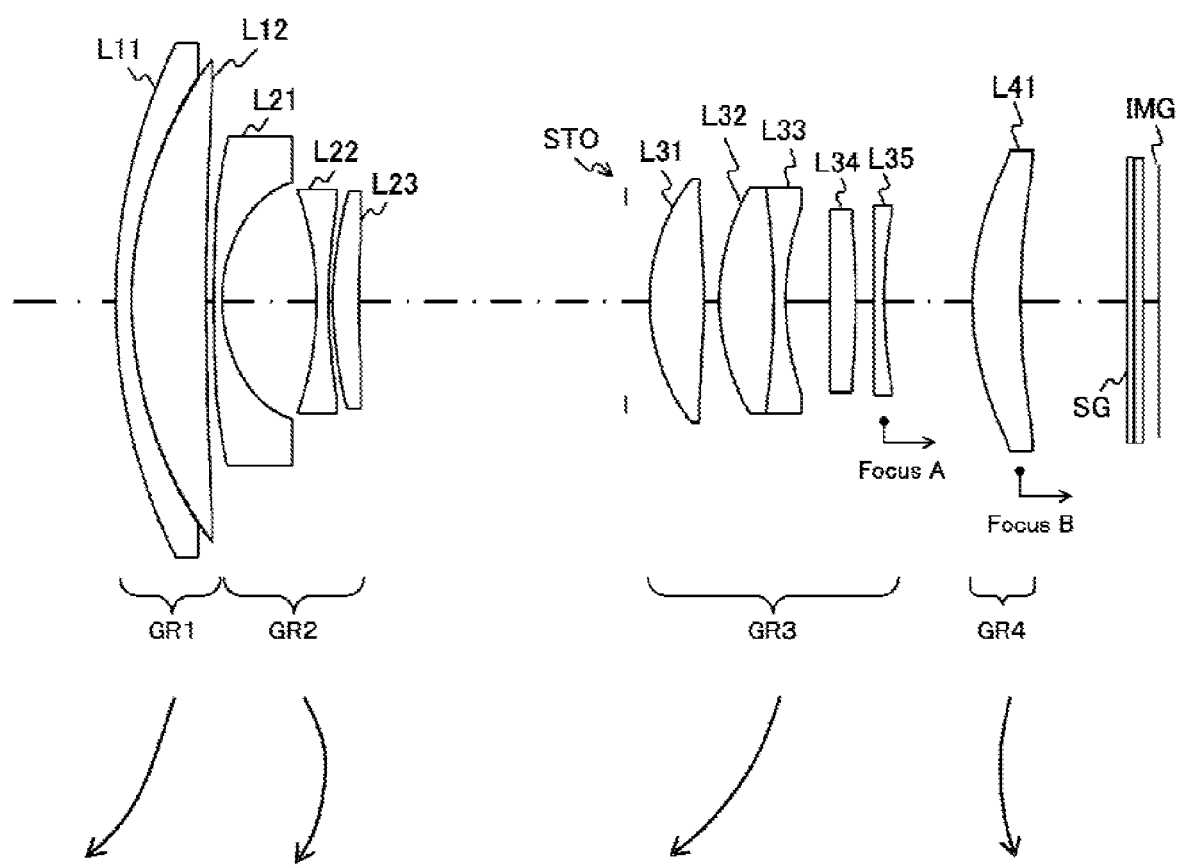
FIG. 16 is a diagram illustrating a lens configuration of a zoom lens according to a fourth embodiment of the present technology.

FIG. 16 is a diagram illustrating a lens configuration of a zoom lens according to Fourth Embodiment of the present technology. The zoom lens according to Fourth Embodiment includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, a positive lens L35 and a meniscus-shaped negative lens L35 concave to the image side in the order from the object side to the image side. That is, different from the other embodiments, in the zoom lens according to Fourth Embodiment, the third zoom lens group GR3 is configured to include five lenses.

The fourth zoom lens group GR4 includes a meniscus-shaped positive lens L41 convex to the object side.

An opening aperture stop STO is disposed on the object side of the third zoom lens group GR3. Moreover, a filter SG is disposed between the fourth zoom lens group GR4 and an image plane IMG.

The zoom lens employs the floating focus system in which focus lens groups A and B move in association with each other in focusing, where the focus lens group A corresponds to the negative lens L35 and the focus lens group B corresponds to the positive lens L41. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

[Specifications of Zoom Lens]

Table 16 presents data of the lenses in Example 4 of Numerical Values, in which specific numerical values are applied to the zoom lens according to Fourth Embodiment.

TABLE 16

| s i | r i | d i | n i | ν i |
|---|---|---|---|---|
| 1 | 36.217 | 1.000 | 1.92286 | 20.880 |
| 2 | 25.483 | 4.650 | 1.77250 | 49.624 |
| 3 | 329.061 | (d 3) | | |
| 4 (ASP) | 337.902 | 0.500 | 1.75501 | 51.158 |
| 5 (ASP) | 10.083 | 5.800 | | |
| 6 | −21.269 | 0.780 | 1.72916 | 54.674 |
| 7 | 34.948 | 0.250 | | |
| 8 (ASP) | 18.476 | 1.720 | 2.00170 | 19.324 |
| 9 (ASP) | 59.801 | (d 9) | | |
| STO | INFINITY | 1.500 | | |
| 11 (ASP) | 12.500 | 3.400 | 1.55332 | 71.685 |
| 12 (ASP) | −72.83 | 1.000 | | |
| 13 | 13.668 | 3.450 | 1.59201 | 67.023 |
| 14 | −51.562 | 0.800 | 1.80518 | 25.456 |
| 15 | 18.817 | 2.725 | | |

TABLE 16-continued

| s i | r i | d i | n i | ν i |
|---|---|---|---|---|
| 16 (ASP) | −500.000 | 1.620 | 1.82080 | 42.706 |
| 17 (ASP) | −38.015 | (d 17) | | |
| 18 | 227.971 | 0.700 | 1.72916 | 54.674 |
| 19 | 35.396 | (d 19) | | |
| 20 (ASP) | 18.361 | 3.000 | 1.52470 | 56.460 |
| 21 (ASP) | 47.800 | (d 21) | | |
| 22 | INFINITY | 0.300 | 1.51680 | 64.200 |
| 23 | INFINITY | 0.150 | | |
| 24 | INFINITY | 0.500 | 1.51680 | 64.200 |
| 25 | INFINITY | 1.000 | | |
| IMG | INFINITY | | | |

In the zoom lens according to Fourth Embodiment, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L41 of the fourth lens group GR4 (twentieth surface and twenty first surface) are non-spherical. Table 17 presents the conic constants κ and the fourth-order, sixth-order, eighth-order and tenth-order non-spherical coefficients A4, A6, A8 and A10 of these surfaces.

TABLE 17

| s i | κ | A4 | A6 | A8 | A10 |
|---|---|---|---|---|---|
| 4 | 0.00000E+00 | 7.82620E−05 | 1.64608E−07 | −4.28811E−09 | 9.41066E−12 |
| 5 | 7.74682E−01 | −8.13657E−05 | 8.77360E−07 | −5.37107E−09 | 2.33725E−11 |
| 8 | 0.00000E+00 | −2.51889E−04 | 2.13844E−06 | −4.91089E−08 | 1.16589E−09 |
| 9 | 0.00000E+00 | −1.87944E−04 | 1.36811E−06 | −4.95772E−08 | 1.08858E−09 |
| 11 | 0.00000E+00 | 8.86948E−06 | 3.77057E−07 | 1.11725E−10 | 0.00000E+00 |
| 12 | 0.00000E+00 | 6.74001E−05 | 3.81661E−07 | −4.18748E−09 | 0.00000E+00 |
| 16 | 0.00000E+00 | −4.39021E−05 | 2.70052E−06 | −9.02502E−08 | 0.00000E+00 |
| 17 | 0.00000E+00 | 1.09128E−04 | 3.95697E−06 | −7.68377E−08 | 5.07392E−10 |
| 20 | −2.51276E+00 | 5.75944E−05 | −8.15026E−07 | 1.83878E−08 | −1.68050E−10 |
| 21 | 1.45502E+00 | 1.91363E−05 | −1.18572E−06 | 2.60741E−08 | −2.27002E−10 |

Table 18 presents the focal lengths f, F values Fno and half FOVs ω at the wide-angle end, at the intermediate focal length and at the telescopic end in Example 4 of Numerical Values.

TABLE 18

| | Wide-Angle End | Intermediate Focal Length | Telescopic End |
|---|---|---|---|
| f | 9.60 | 23.40 | 57.02 |
| Fno | 2.04 | 2.57 | 3.67 |
| ω | 41.44 | 18.46 | 7.55 |

In the zoom lens according to Fourth Embodiment, in zooming between the wide-angle end and telescopic end, a spacing d3 between the first lens group GR1 and second lens group GR2, a spacing d9 between the second lens group GR2 and third lens group GR3, a spacing d17 between the positive lens L34 and negative lens L35, a spacing d19 between the third lens group GR3 and fourth lens group GR4 and a spacing d21 between the fourth lens group GR4 and filter SG vary, where the subject distance is infinity. Table 19 presents the variable spacings with respect to the respective spacings at the wide-angle end, at the intermediate focal length and at the telescopic end in this case.

TABLE 19

| (Infinity) | Wide-Angle End | Intermediate Focal Length | Telescopic End |
|---|---|---|---|
| Subject Distance | Infinity | Infinity | Infinity |
| d 3 | 0.500 | 12.311 | 23.238 |
| d 9 | 16.580 | 5.351 | 1.500 |
| d 17 | 1.100 | 1.100 | 1.100 |
| d 19 | 5.502 | 5.562 | 29.010 |
| d 21 | 6.658 | 14.590 | 6.000 |

Moreover, in the zoom lens according to Fourth Embodiment, in zooming between the wide-angle end and telescopic end, a spacing d17 between the positive lens L34 and negative lens L35, a spacing d19 between the third lens group GR3 and fourth lens group GR4 and a spacing d21 between the fourth lens group GR4 and filter SG vary, where the subject distance is close. Table 20 presents the variable spacings with respect to the respective spacings at the wide-angle end, at the intermediate focal length and at the telescopic end in this case.

TABLE 20

| (Close) | Wide-Angle End | Intermediate Focal Length | Telescopic End |
|---|---|---|---|
| Subject Distance | 70 m | 250 mm | 850 mm |
| d 17 | 6.886 | 4.183 | 4.969 |
| d 19 | 3.778 | 2.482 | 28.763 |
| d 21 | 2.596 | 14.587 | 2.378 |

[Aberration of Zoom Lens]

Figure 17:
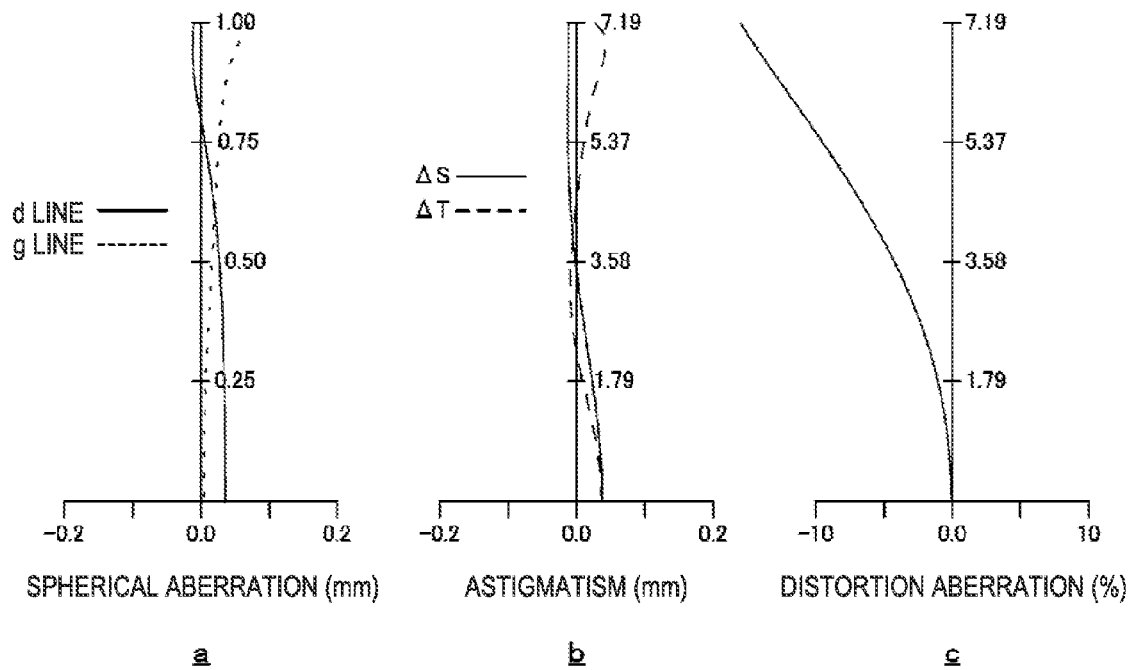
FIG. 17 is aberration diagrams of a zoom lens according to the fourth embodiment of the present technology at the wide-angle end at infinity focus.
Figure 18:
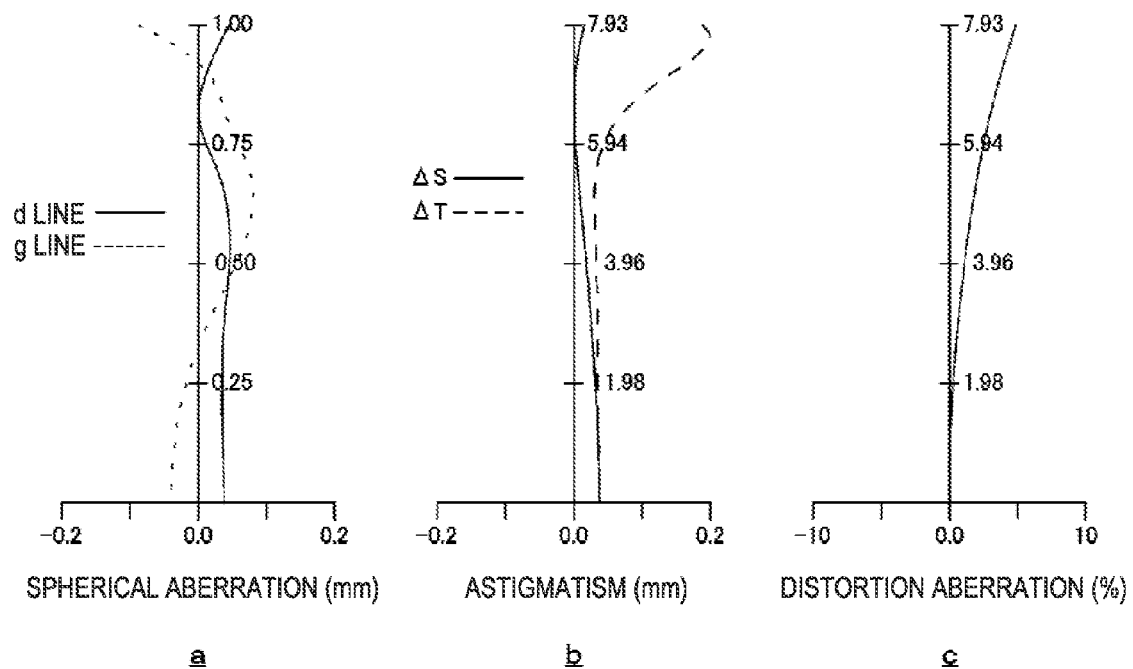
FIG. 18 is aberration diagrams of the zoom lens according to the fourth embodiment of the present technology at the telescopic end at infinity focus.

FIGS. 17 and 18 illustrate aberration diagrams of the zoom lens according to Fourth Embodiment of the present technology at infinity focus. FIG. 17 and FIG. 18 illustrate aberration diagrams at the wide-angle end and at the telescopic end, respectively. Portions a, portions b and portions c in these figures illustrate spherical aberration diagrams, astigmatism diagrams (field curvature diagrams) and distortion aberration diagrams, respectively.

Figure 19:
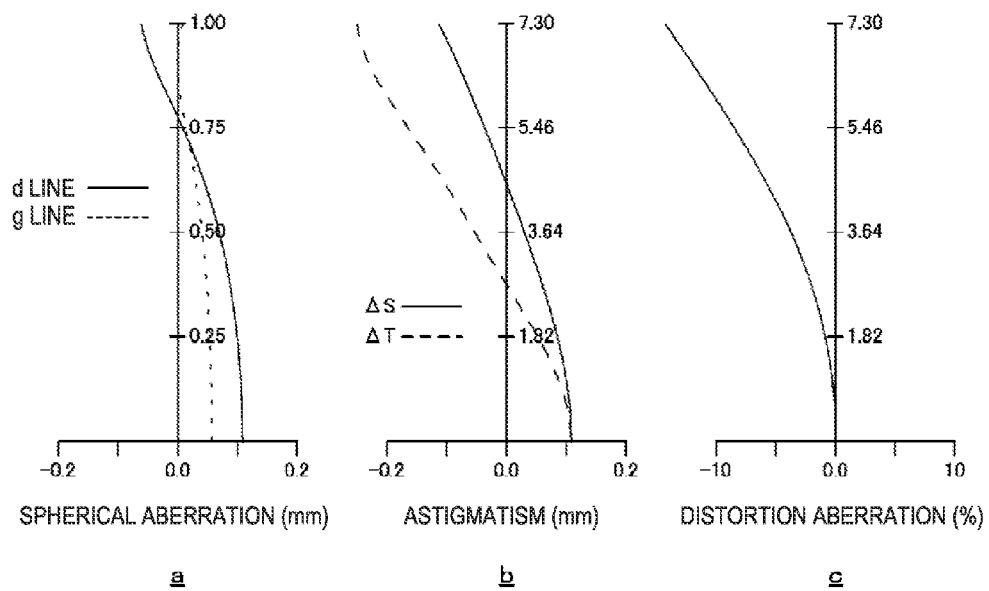
FIG. 19 is aberration diagrams of the zoom lens according to the fourth embodiment of the present technology at the wide-angle end at close focus.
Figure 20:
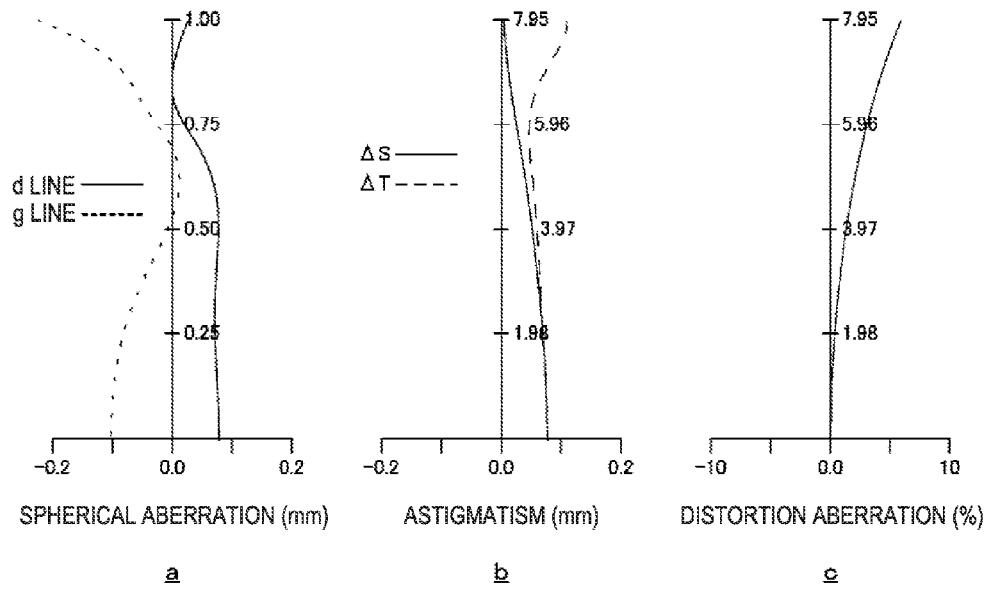
FIG. 20 is aberration diagrams of the zoom lens according to the fourth embodiment of the present technology at the telescopic end at close focus.

FIGS. 19 and 20 illustrate aberration diagrams of the zoom lens according to Fourth Embodiment of the present technology at close focus. FIG. 19 and FIG. 20 illustrate aberration diagrams at the wide-angle end and at the telescopic end, respectively. Similarly, portions a, portions b and portions c in these figures illustrate spherical aberration diagrams, astigmatism diagrams (field curvature diagrams) and distortion aberration diagrams, respectively.

It is apparent from the aberration diagrams that Example 4 of Numerical Values attains excellent imaging performance, correcting the aberrations favorably.

5. Fifth Embodiment

[Lens Configuration]

Figure 21:
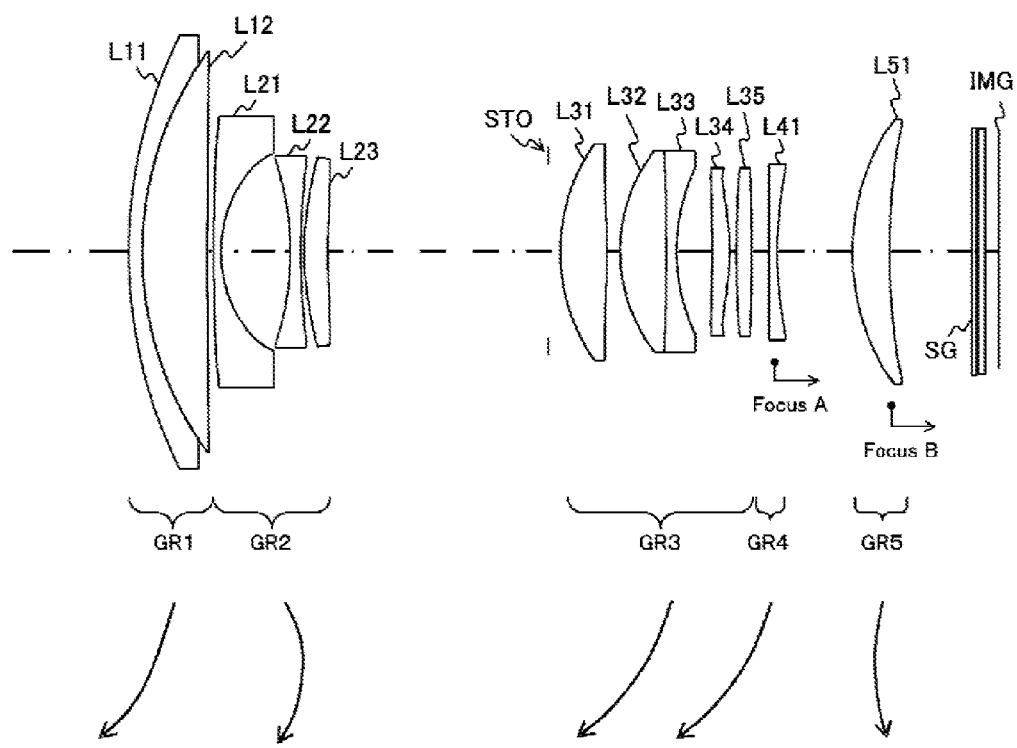
FIG. 21 is a diagram illustrating a lens configuration of a zoom lens according to a fifth embodiment of the present technology.

FIG. 21 is a diagram illustrating a lens configuration of a zoom lens according to Fifth Embodiment of the present technology. The zoom lens according to Fifth Embodiment includes, in the order from the object side, a first zoom lens group GR1 having positive refractive power, a second zoom lens group GR2 having negative refractive power, a third zoom lens group GR3 having positive refractive power, a fourth zoom lens group GR4 having negative refractive power, and a fifth zoom lens group GR5 having positive refractive power The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, and a positive lens L35 in the order from the object side to the image side.

The fourth zoom lens group GR4 includes a meniscus-shaped negative lens L41 convex to the image side.

The fifth zoom lens group GR5 includes a meniscus-shaped positive lens L51 convex to the object side.

An opening aperture stop STO is disposed on the object side of the third zoom lens group GR3. Moreover, a filter SG is disposed between the fifth zoom lens group GR5 and an image plane IMG.

The zoom lens employs the floating focus system in which focus lens groups A and B move in association with each other in focusing, where the focus lens group A corresponds to the negative lens L41 and the focus lens group B corresponds to the positive lens L51. That is, different from the other embodiments, the focus lens group A is configured to be independent from the third lens groups GR3. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

[Specifications of Zoom Lens]

Table 21 presents data of the lenses in Example 5 of Numerical Values, in which specific numerical values are applied to the zoom lens according to Fifth Embodiment.

TABLE 21

| s i | r i | d i | n i | v i |
|---|---|---|---|---|
| 1 | 35.292 | 1.000 | 1.92286 | 20.880 |
| 2 | 24.730 | 4.620 | 1.77250 | 49.624 |
| 3 | 460.000 | (d 3) | | |
| 4 (ASP) | 393.196 | 0.500 | 1.75501 | 51.158 |
| 5 (ASP) | 9.228 | 5.219 | | |
| 6 | −20.000 | 0.750 | 1.72916 | 54.674 |
| 7 | 53.460 | 0.250 | | |
| 8 (ASP) | 19.883 | 1.700 | 2.00170 | 19.324 |
| 9 (ASP) | 79.274 | (d 9) | | |
| STO | INFINITY | 0.800 | | |
| 11 (ASP) | 13.350 | 3.380 | 1.55332 | 71.685 |
| 12 (ASP) | −85.00 | 1.000 | | |
| 13 | 12.000 | 3.430 | 1.59201 | 67.023 |
| 14 | −150.000 | 0.770 | 1.80518 | 25.456 |
| 15 | 14.476 | 2.600 | | |
| 16 (ASP) | −54.397 | 1.200 | 1.72903 | 54.041 |
| 17 (ASP) | −22.069 | 0.500 | | |
| 18 | 96.951 | 1.120 | 1.72916 | 54.674 |
| 19 | −202.079 | (d 19) | | |
| 20 | 259.721 | 0.700 | 1.72916 | 54.674 |
| 21 | 35.396 | (d 21) | | |
| 22 (ASP) | 17.900 | 2.650 | 1.52470 | 56.460 |
| 23 (ASP) | 50.602 | (d 23) | | |
| 24 | INFINITY | 0.300 | 1.51680 | 64.200 |
| 25 | INFINITY | 0.150 | | |
| 26 | INFINITY | 0.500 | 1.51680 | 64.200 |
| 27 | INFINITY | 1.000 | | |
| IMG | INFINITY | | | |

In the zoom lens according to Fifth Embodiment, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L51 of the fifth lens group GR5 (twenty second surface and twenty third surface) are non-spherical. Table 22 presents the conic constants κ and the fourth-order, sixth-order, eighth-order and tenth-order non-spherical coefficients A4, A6, A8 and A10 of these surfaces.

TABLE 22

| s i | κ | A4 | A6 | A8 | A10 |
|---|---|---|---|---|---|
| 4  | 0.00000E+00  | 2.61659E−05  | 4.51425E−07  | −4.91223E−09 | 1.10079E−11 |
| 5  | 5.27845E−01  | −1.35553E−04 | −1.81011E−07 | 1.27051E−08  | −4.78410E−10 |
| 8  | 0.00000E+00  | −1.82519E−04 | 2.59145E−06  | −1.01496E−07 | 1.72052E−09 |
| 9  | 0.00000E+00  | −1.28611E−04 | 2.09350E−06  | −1.01562E−07 | 1.62898E−09 |
| 11 | 0.00000E+00  | −9.46873E−07 | 5.42585E−07  | −4.04856E−09 | 0.00000E+00 |
| 12 | 0.00000E+00  | 5.19703E−05  | 5.69377E−07  | −7.75606E−08 | 0.00000E+00 |
| 16 | 0.00000E+00  | −1.65699E−04 | 7.59077E−06  | −3.67694E−09 | 0.00000E+00 |
| 17 | −1.00000E+01 | −1.17997E−04 | 9.03391E−06  | −6.61906E−09 | 9.51441E−10 |
| 22 | −5.96821E−01 | 4.22180E−05  | −7.98499E−07 | 1.44316E−08  | −5.74748E−11 |
| 23 | 1.54855E+00  | 4.69605E−05  | −1.97526E−06 | 3.15109E−08  | −1.50527E−10 |

Table 23 presents the focal lengths f, F values Fno and half FOVs ω at the wide-angle end, at the intermediate focal length and at the telescopic end in Example 5 of Numerical Values.

TABLE 23

|  | Wide-Angle End | Intermediate Focal Length | Telescopic End |
|---|---|---|---|
| f   | 9.58  | 19.82 | 41.00 |
| Fno | 1.87  | 2.26  | 3.00  |
| ω   | 41.42 | 21.78 | 10.57 |

In the zoom lens according to Fifth Embodiment, in zooming between the wide-angle end and telescopic end, a spacing d3 between the first lens group GR1 and second lens group GR2, a spacing d9 between the second lens group GR2 and third lens group GR3, a spacing d19 between the positive lens L35 and negative lens L41, a spacing d21 between the fourth lens group GR4 and fifth lens group GR5 and a spacing d23 between the fifth lens group GR5 and filter SG vary, where the subject distance is infinity. Table 24 presents the variable spacings with respect to the respective spacings at the wide-angle end, at the intermediate focal length and at the telescopic end in this case.

TABLE 24

| (Infinity) | Wide-Angle End | Intermediate Focal Length | Telescopic End |
|---|---|---|---|
| Subject Distance | Infinity | Infinity | Infinity |
| d 3  | 0.500  | 9.623  | 18.321 |
| d 9  | 16.080 | 6.649  | 2.600  |
| d 19 | 1.200  | 1.248  | 1.201  |
| d 21 | 5.497  | 7.731  | 22.719 |
| d 23 | 6.031  | 10.472 | 5.800  |

Moreover, in the zoom lens according to Fifth Embodiment, in zooming between the wide-angle end and telescopic end, a spacing d19 between the positive lens L35 and negative lens L41, a spacing d21 between the fourth lens group GR4 and fifth lens group GR5 and a spacing d23 between the fifth lens group GR5 and filter SG vary, where the subject distance is close. Table 25 presents the variable spacings with respect to the respective spacings at the wide-angle end, at the intermediate focal length and at the telescopic end in this case.

TABLE 25

| (Close) | Wide-Angle End | Intermediate Focal Length | Telescopic End |
|---|---|---|---|
| Subject Distance | 50 mm | 200 mm | 800 mm |
| d 19 | 4.479 | 4.116  | 4.324  |
| d 21 | 2.218 | 4.863  | 23.499 |
| d 23 | 6.031 | 10.472 | 1.898  |

[Aberration of Zoom Lens]

FIGS. 22 and 23 illustrate aberration diagrams of the zoom lens according to Fifth Embodiment of the present technology at infinity focus. FIG. 22 and FIG. 23 illustrate aberration diagrams at the wide-angle end and at the telescopic end, respectively. Portions a, portions b and portions c in these figures illustrate spherical aberration diagrams, astigmatism diagrams (field curvature diagrams) and distortion aberration diagrams, respectively.

Figure 24:
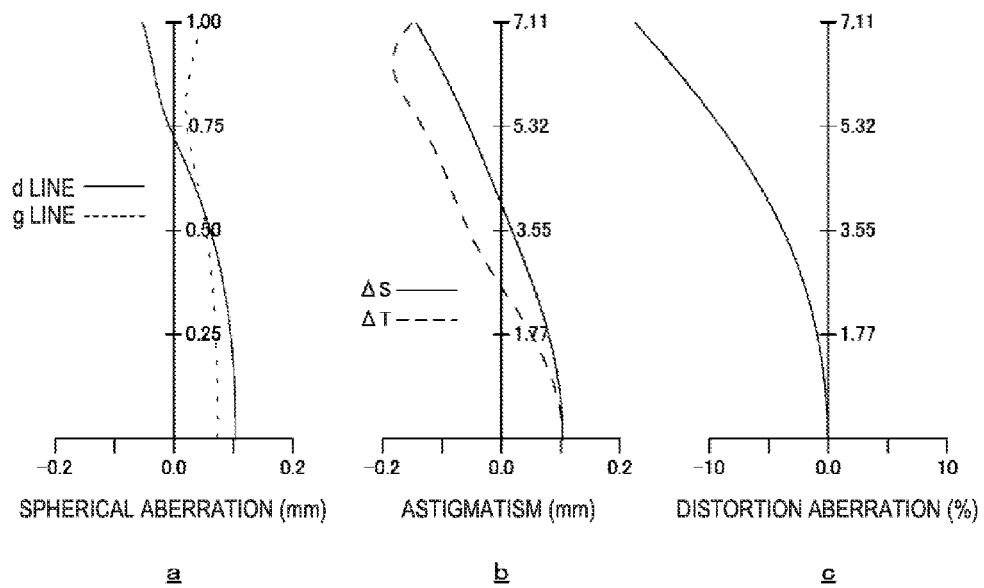
FIG. 24 is aberration diagrams of the zoom lens according to the fifth embodiment of the present technology at the wide-angle end at close focus.
Figure 25:
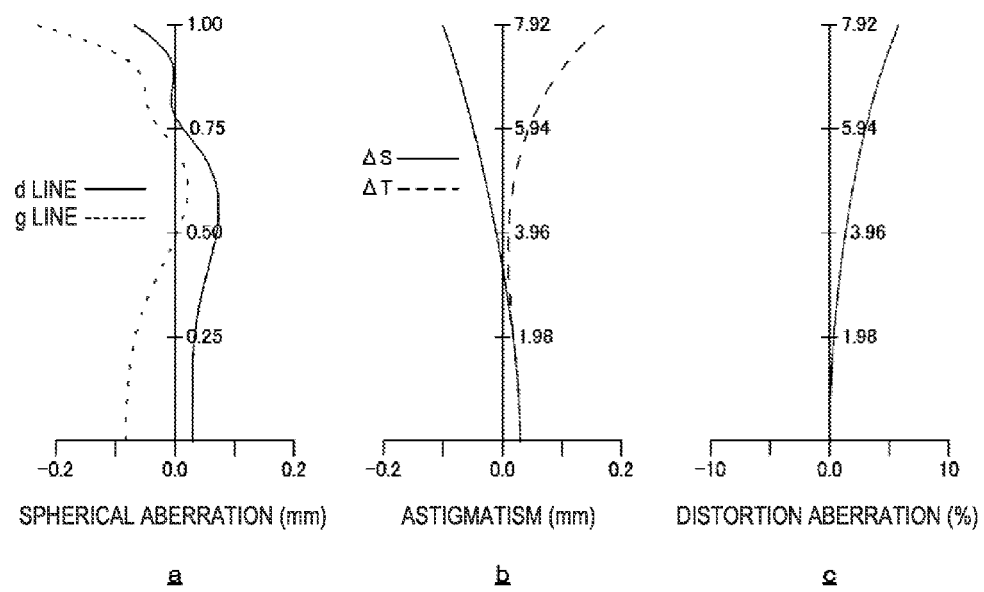
FIG. 25 is aberration diagrams of the zoom lens according to the fifth embodiment of the present technology at the telescopic end at close focus.

FIGS. 24 and 25 illustrate aberration diagrams of the zoom lens according to Fifth Embodiment of the present technology at close focus. FIG. 24 and FIG. 25 illustrate aberration diagrams at the wide-angle end and at the telescopic end, respectively. Similarly, portions a, portions b and portions c in these figures illustrate spherical aberration diagrams, astigmatism diagrams (field curvature diagrams) and distortion aberration diagrams, respectively.

It is apparent from the aberration diagrams that Example 5 of Numerical Values attains excellent imaging performance, correcting the aberrations favorably.

[Summary of Conditional Expressions]

Table 26 presents the values in Examples 1 to 5 of Numerical Values according to First to Fifth Embodiments. It is apparent from the values that the conditional expressions (a) to (f) are satisfied. Moreover, it is apparent from the aberration diagrams that the aberrations are corrected at the wide-angle end and at the telescopic end in a well-balanced manner.

TABLE 26

|  |  | Example 1 | Example 2 | Example 3 | Example 4 | Example 5 |
|---|---|---|---|---|---|---|
| Conditional Expression (a) | $(1 - \beta_{AW}^2) \times (\beta_{Bihind\_AW})^2$ | −0.406 | −0.457 | −0.370 | −0.475 | −0.459 |
| Conditional Expression (b) | $(1 - \beta_{AT}^2) \times (\beta_{Bihind\_AT})^2$ | −0.905 | −1.026 | −0.763 | −1.259 | −1.030 |
| Conditional Expression (c) | $(1 - \beta_{BW}^2) \times (\beta_{Bihind\_BW})^2$ | 0.352 | 0.363 | 0.326 | 0.375 | 0.364 |
| Conditional Expression (d) | $(1 - \beta_{BT}^2) \times (\beta_{Bihind\_BT})^2$ | 0.340 | 0.354 | 0.311 | 0.355 | 0.355 |
| Conditional Expression (e) | $D_{BW}/D_{AW}$ | 0.000 | 0.000 | 0.000 | 0.702 | 0.000 |
| Conditional Expression (f) | $D_{BT}/D_{AT}$ | 1.125 | 1.250 | 1.056 | 0.936 | 1.250 |
|  | $\beta_{AW}$ | 1.275 | 1.311 | 1.245 | 1.327 | 1.312 |
|  | $\beta_{Bihind\_AW}$ | 0.805 | 0.798 | 0.821 | 0.791 | 0.798 |
|  | $\beta_{AT}$ | 1.540 | 1.609 | 1.451 | 1.718 | 1.612 |
|  | $\beta_{Bihind\_AT}$ | 0.812 | 0.804 | 0.830 | 0.803 | 0.803 |
|  | $\beta_{BW}$ | 0.805 | 0.798 | 0.821 | 0.791 | 0.798 |
|  | $\beta_{Bihind\_BW}$ | 1.000 | 1.000 | 1.000 | 1.000 | 1.000 |
|  | $\beta_{BT}$ | 0.812 | 0.804 | 0.830 | 0.803 | 0.803 |
|  | $\beta_{Bihind\_BT}$ | 1.000 | 1.000 | 1.000 | 1.000 | 1.000 |

6. Application Example

[Configuration of Image Capturing Apparatus]

Figure 26:
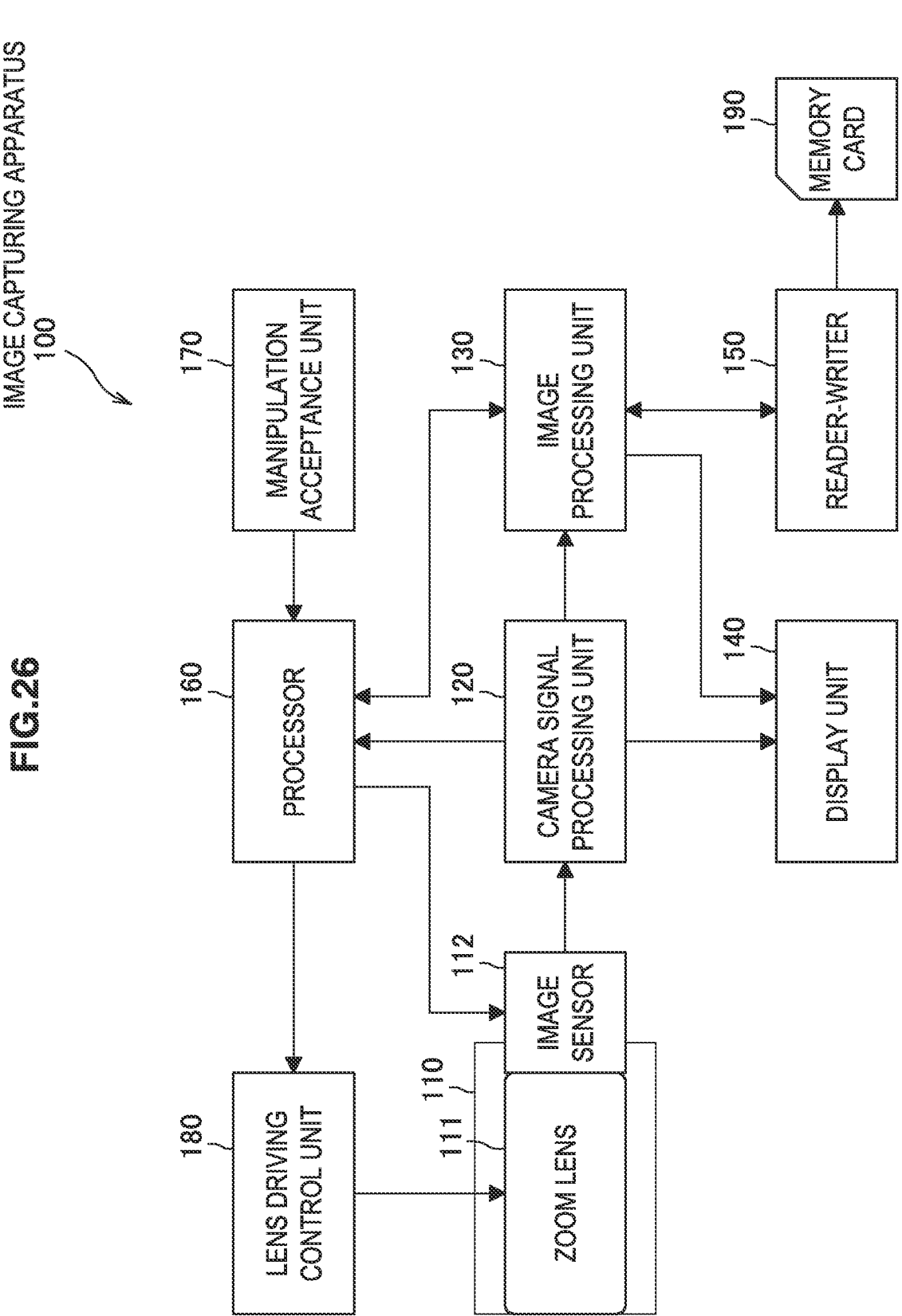
FIG. 26 is a diagram illustrating an image capturing apparatus 100 to which any of the zoom lenses according to the first to twelfth embodiments of the present technology is applied.

FIG. 26 is a diagram illustrating an example of an image capturing apparatus 100 to which the zoom lens according to any of the first to fifth embodiments of the present technology. The image capturing apparatus 100 includes a camera block 110, a camera signal processing unit 120, an image processing unit 130, a display unit 140, a reader-writer 150, a processor 160, a manipulation acceptance unit 170 and a lens driving control unit 180.

The camera block 110 takes on an image capturing function, and includes a zoom lens 111 according to any of First to Fifth embodiments and an image sensor 112 converting an optical image formed by the zoom lens 111 into an electric signal. The image sensor 112 can employ a photoelectric transducer such, for example, as a CCD (Charge Coupled Device) and CMOS (Complementary Metal-Oxide Semiconductor). The zoom lens 111 is herein simply illustrated as a single lens, which indicates the lens groups according to any of First to Fifth embodiments.

The camera signal processing unit 120 performs signal processing such as analog-digital conversion on a captured image signal. The camera signal processing unit 120 converts an output signal from the image sensor 112 into a digital signal. Moreover, the camera signal processing unit 120 performs various kinds of signal processing such as noise reduction, image quality correction, conversion into luminance-chromaticity signals.

The image processing unit 130 performs recording/playing-back processing of the image signal. The image processing unit 130 performs compression encoding and decompression decoding of the image signal based on a predetermined image data format and conversion of data specifications such as resolution.

The display unit 140 displays the captured image and the like. The display unit 140 has a function of displaying a manipulation status in the manipulation acceptance unit 170 and various kinds of data of the captured image and the like. The display unit 140 can include, for example, a liquid crystal display (LCD).

The reader-writer 150 performs access to the memory card 190 which access is writing and read-out of the image signal. The reader-writer 150 writes the image data encoded by the image processing unit 130 to the memory card 190, and reads out the image data recorded in the memory card 190. The memory card 190 is, for example, a semiconductor memory removable to the slot connected to the reader-writer 150.

The processor 160 controls the whole image capturing apparatus. The processor 160 functions as a control processing unit controlling the individual circuit blocks provided in the image capturing apparatus 100, and controls the individual circuit blocks based on manipulation instruction signals from the manipulation acceptance unit 170.

The manipulation acceptance unit 170 accepts manipulation from the user. The manipulation acceptance unit 170 can implemented, for example, by a shutter release button for performing shutter operation, a selection switch for selecting an operation mode, and the like. The manipulation instruction signal accepted by the manipulation acceptance unit 170 is supplied to the processor 160.

The lens driving control unit 180 controls driving of the lenses disposed in the camera block 110. The lens driving control unit 180 controls a motor and the like (not illustrated in the figure) for driving the lenses of the zoom lens 111 based on the control signals from the processor 160.

In standing-by for image capturing, the image capturing apparatus 100 outputs the image signal captured by the camera block 110 via the camera signal processing unit 120 to the display unit 140 under the control of the processor 160, and displays it as a camera-through image. Moreover, upon acceptance of the manipulation instruction signal for zooming in the manipulation acceptance unit 170, the processor 160 outputs the control signal to the lens driving control unit 180, predetermined lenses in the zoom lens 111 are moved based on the control of the lens driving control unit 180.

Upon acceptance of the shutter manipulation in the manipulation acceptance unit 170, the captured image signal is outputted from the camera signal processing unit 120 to the image processing unit 130 to undergo compression encoding and conversion into digital data in a predetermined format. The converted data is outputted to the reader-writer 150 and written in the memory card 190.

Focusing is performed, for example, on the occasions such as a half push of the shutter release button and a full push thereof for recording (image capturing) in the manipulation acceptance unit 170. In this case, the lens driving control unit 180 moves the predetermined lenses in the zoom lens 111 based on the control signal from the processor 160.

When playing back the image data recorded in the memory card 190, the reader-writer 150 reads out a predetermined image data from the memory card 190 according to the manipulation accepted by the manipulation acceptance unit 170. Then, after decompression decoding by the image processing unit 130, the image signal to be played back is outputted to the display unit 140 and the played-back image is displayed.

Incidentally, in the above-mentioned embodiments, a digital still camera is supposed exemplarily as the image capturing apparatus 100, whereas the image capturing apparatus 100 is not limited to the digital still camera but can be widely applied to digital input/output equipment such as a digital video camera.

As above, according to the embodiments of the present technology, in focusing from a long distance to a short distance, moving the focus lens groups A and B in orientation to the image side along the optical axis enables aberration to be corrected efficiently. Thereby, a zoom lens affording high image quality over the whole zoom range and the whole focus range can be attained.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A zoom lens including:

a first focus lens group having negative refractive power and moving in orientation to an image side along an optical axis in focusing from a long distance to a short distance; and a second focus lens group having positive refractive power, the second focus lens group being arranged on a closer side to an image relative to the first focus lens group and moving along the optical axis in focusing, wherein the first and second focus lens groups move in association with each other.

(2) The zoom lens according to (1), wherein the second focus lens group moves in orientation to the image side along the optical axis in focusing from the long distance to the short distance.

(3) The zoom lens according to (1) or (2), wherein the first and second focus lens groups satisfy the following conditional expressions (a) to (d), $$(1-\beta_{AW}^2) \times (\beta_{Bihind\_AW})^2 < 0 \quad \text{conditional expression (a)}$$

$$(1-\beta_{AT}^2) \times (\beta_{Bihind\_AT})^2 < 0 \quad \text{conditional expression (b)}$$

$$(1-\beta_{BW}^2) \times (\beta_{Bihind\_BW})^2 < 0 \quad \text{conditional expression (c)}$$

$$(1-\beta_{BT}^2) \times (\beta_{Bihind\_BT})^2 < 0 \quad \text{conditional expression (d)}$$

where $\beta_{AW}$: lateral magnification of the first focus lens group at a wide-angle end, $\beta_{Bihind\_AW}$: lateral magnification of an optical system on the closer side to the image relative to the first focus lens group at a wide-angle end, $\beta_{AT}$: lateral magnification of the first focus lens group at a telescopic end, $\beta_{Bihind\_AT}$: lateral magnification of the optical system on the closer side to the image relative to the first focus lens group at a telescopic end, $\beta_{BW}$: lateral magnification of the second focus lens group at a wide-angle end, $\beta_{Bihind\_BW}$: lateral magnification of an optical system on a closer side to the image relative to the second focus lens group at a wide-angle end, $\beta_{BT}$: lateral magnification of the second focus lens group at a telescopic end, and $\beta_{Bihind\_BT}$: lateral magnification of the optical system on the closer side to the image relative to the second focus lens group at a telescopic end.

(4) The zoom lens according to any one of (1) to (3), wherein relative relationship between lens movement distances of the first and second focus lens groups in focusing changes per zoom position.

(5) The zoom lens according to any one of (1) to (4), wherein lens movement distances of the first and second focus lens groups in focusing meet linearity for each other.

(6) The zoom lens according to (5), wherein the lens movement distances of the first and second focus lens groups in focusing satisfy the following conditional expressions (e) and (f), $$0 \leq D_{BW}/D_{AW} < 1.0 \quad \text{conditional expression (e)}$$

$$0.5 \leq D_{BT}/D_{AT} < 1.5 \quad \text{conditional expression (f)}$$

where $D_{AW}$: lens movement distance of the first focus lens group in focusing at a wide-angle end, $D_{BW}$: lens movement distance of the second focus lens group in focusing at a wide-angle end, $D_{AT}$: lens movement distance of the first focus lens group in focusing at a telescopic end, and $D_{BT}$: lens movement distance of the second focus lens group in focusing at a telescopic end.

(7) The zoom lens according to any one of (1) to (6), wherein the first focus lens group is constituted of only one negative lens.

(8) The zoom lens according to any one of (1) to (7), wherein the second focus lens group is constituted of only one positive lens.

(9) The zoom lens according to any one of (1) to (8), wherein the first and second focus lens groups are sequentially arranged alongside on a closest side to the image in an optical system.

(10) The zoom lens according to any one of (1) to (9), further including: in order from an object side, a first zoom lens group having positive refractive power;

a second zoom lens group having negative refractive power;

a third zoom lens group having positive refractive power; and a fourth zoom lens group having positive refractive power, wherein the first focus lens group is a negative lens arranged on a closest side to the image in the third zoom lens group, and wherein the second focus lens group is a positive lens included in the fourth zoom lens group.

(11) The zoom lens according to any one of (1) to (10), further including: in order from an object side, a first zoom lens group having positive refractive power;

a second zoom lens group having negative refractive power;

a third zoom lens group having positive refractive power;

a fourth zoom lens group having negative refractive power; and a fifth zoom lens group having positive refractive power, wherein the first focus lens group is a negative lens included in the fourth zoom lens group, and wherein the second focus lens group is a positive lens included in the fifth zoom lens group.

(12) The zoom lens according to any one of (1) to (11), further including:
a lens having substantially no lens power.

(13) An image capturing apparatus including:
a zoom lens including a first focus lens group having negative refractive power and moving in orientation to an image side along an optical axis in focusing from a long distance to a short distance, and a second focus lens group having positive refractive power, the second focus lens group being arranged on a closer side to an image relative to the first focus lens group and moving along the optical axis in focusing; and
an image sensor converting an optical image formed by the zoom lens into an electric signal,
wherein the first and second focus lens groups move in association with each other.

(14) The image capturing apparatus according to (13), further including:
a lens having substantially no lens power in the zoom lens.

The present disclosure contains subject matter related to that disclosed in Japanese Priority Patent Application JP 2012-213327 filed in the Japan Patent Office on Sep. 27, 2012, the entire content of which is hereby incorporated by reference.

What is claimed is:

1. A zoom lens comprising:
a first focus lens group having negative refractive power and moving in orientation to an image side along an optical axis in focusing from a long distance to a short distance; and
a second focus lens group having positive refractive power, the second focus lens group being arranged on a closer side to an image relative to the first focus lens group and moving along the optical axis in focusing,
wherein the first and second focus lens groups move in association with each other, and
wherein the first and second focus lens groups satisfy the following conditional expressions (a) to (d), $(1-\beta_{AW}^2) \times (\beta_{Bihind\_AW})^2 < 0$   conditional expression (a)

$(1-\beta_{AT}^2) \times (\beta_{Bihind\_AT})^2 < 0$   conditional expression (b)

$(1-\beta_{BW}^2) \times (\beta_{Bihind\_BW})^2 < 0$   conditional expression (c)

$(1-\beta_{BT}^2) \times (\beta_{Bihind\_BT})^2 < 0$   conditional expression (d)

where
$\beta_{AW}$: lateral magnification of the first focus lens group at a wide-angle end,
$\beta_{Bihind\_AW}$: lateral magnification of an optical system on the closer side to the image relative to the first focus lens group at a wide-angle end,
$\beta_{AT}$: lateral magnification of the first focus lens group at a telescopic end,
$\beta_{Bihind\_AT}$: lateral magnification of the optical system on the closer side to the image relative to the first focus lens group at a telescopic end,
$\beta_{BW}$: lateral magnification of the second focus lens group at a wide-angle end,
$\beta_{Bihind\_BW}$: lateral magnification of an optical system on a closer side to the image relative to the second focus lens group at a wide-angle end,
$\beta_{BT}$: lateral magnification of the second focus lens group at a telescopic end, and
$\beta_{Bihind\_BT}$: lateral magnification of the optical system on the closer side to the image relative to the second focus lens group at a telescopic end.

2. The zoom lens according to claim 1,
wherein the second focus lens group moves in orientation to the image side along the optical axis in focusing from the long distance to the short distance.

3. The zoom lens according to claim 1,
wherein relative relationship between lens movement distances of the first and second focus lens groups in focusing changes per zoom position.

4. The zoom lens according to claim 1,
wherein lens movement distances of the first and second focus lens groups in focusing meet linearity for each other.

5. The zoom lens according to claim 1,
wherein the first focus lens group is constituted of only one negative lens.

6. The zoom lens according to claim 1,
wherein the second focus lens group is constituted of only one positive lens.

7. The zoom lens according to claim 1,
wherein the first and second focus lens groups are sequentially arranged alongside on a closest side to the image in an optical system.

8. The zoom lens according to claim 1, further comprising: in order from an object side,
a first zoom lens group having positive refractive power;
a second zoom lens group having negative refractive power;
a third zoom lens group having positive refractive power; and
a fourth zoom lens group having positive refractive power,
wherein the first focus lens group is a negative lens arranged on a closest side to the image in the third zoom lens group, and
wherein the second focus lens group is a positive lens included in the fourth zoom lens group.

9. The zoom lens according to claim 1, further comprising: in order from an object side,
a first zoom lens group having positive refractive power;
a second zoom lens group having negative refractive power;
a third zoom lens group having positive refractive power;
a fourth zoom lens group having negative refractive power; and
a fifth zoom lens group having positive refractive power,
wherein the first focus lens group is a negative lens included in the fourth zoom lens group, and
wherein the second focus lens group is a positive lens included in the fifth zoom lens group.

10. A zoom lens comprising:
a first focus lens group having negative refractive power and moving in orientation to an image side along an optical axis in focusing from a long distance to a short distance; and
a second focus lens group having positive refractive power, the second focus lens group being arranged on a closer side to an image relative to the first focus lens group and moving along the optical axis in focusing,
wherein the first and second focus lens groups move in association with each other, and wherein the lens movement distances of the first and second focus lens groups in focusing satisfy the following conditional expressions (e) and (f), $$0 \leq D_{BW}/D_{AW} < 1.0 \quad \text{conditional expression (e)}$$

$$0.5 \leq D_{BT}/D_{AT} < 1.5 \quad \text{conditional expression (f)}$$

where $D_{AW}$: lens movement distance of the first focus lens group in focusing at a wide-angle end, $D_{BW}$: lens movement distance of the second focus lens group in focusing at a wide-angle end, $D_{AT}$: lens movement distance of the first focus lens group in focusing at a telescopic end, and $D_{BT}$: lens movement distance of the second focus lens group in focusing at a telescopic end.

11. An image capturing apparatus comprising:
a zoom lens including a first focus lens group having negative refractive power and moving in orientation to an image side along an optical axis in focusing from a long distance to a short distance, and a second focus lens group having positive refractive power, the second focus lens group being arranged on a closer side to an image relative to the first focus lens group and moving along the optical axis in focusing; and
an image sensor converting an optical image formed by the zoom lens into an electric signal,
wherein the first and second focus lens groups move in association with each other, and
wherein the first and second focus lens groups satisfy the following conditional expressions (a) to (d), $$(1-\beta_{AW}^2) \times (\beta_{Bihind\_AW})^2 < 0 \quad \text{conditional expression (a)}$$

$$(1-\beta_{AT}^2) \times (\beta_{Bihind\_AT})^2 < 0 \quad \text{conditional expression (b)}$$

$$(1-\beta_{BW}^2) \times (\beta_{Bihind\_BW})^2 < 0 \quad \text{conditional expression (c)}$$

$$(1-\beta_{BT}^2) \times (\beta_{Bihind\_BT})^2 < 0 \quad \text{conditional expression (d)}$$

where $\beta_{AW}$: lateral magnification of the first focus lens group at a wide-angle end, $\beta_{Bihind\_AW}$: lateral magnification of an optical system on the closer side to the image relative to the first focus lens group at a wide-angle end, $\beta_{AT}$: lateral magnification of the first focus lens group at a telescopic end, $\beta_{Bihind\_AT}$: lateral magnification of the optical system on the closer side to the image relative to the first focus lens group at a telescopic end, $\beta_{BW}$: lateral magnification of the second focus lens group at a wide-angle end, $\beta_{Bihind\_BW}$: lateral magnification of an optical system on a closer side to the image relative to the second focus lens group at a wide-angle end, $\beta_{BT}$: lateral magnification of the second focus lens group at a telescopic end, and $\beta_{Bihind\_BT}$: lateral magnification of the optical system on the closer side to the image relative to the second focus lens group at a telescopic end.

12. The image capturing device according to claim 11, wherein the second focus lens group moves in orientation to the image side along the optical axis in focusing from the long distance to the short distance.

13. The image capturing device according to claim 11, wherein relative relationship between lens movement distances of the first and second focus lens groups in focusing changes per zoom position.

14. The image capturing device according to claim 11, wherein lens movement distances of the first and second focus lens groups in focusing meet linearity for each other.

15. The image capturing device according to claim 11, wherein the first focus lens group is constituted of only one negative lens.

16. The image capturing device according to claim 11, wherein the second focus lens group is constituted of only one positive lens.

17. The image capturing device according to claim 11, wherein the first and second focus lens groups are sequentially arranged alongside on a closest side to the image in an optical system.

18. The image capturing device according to claim 11, further comprising: in order from an object side,
a first zoom lens group having positive refractive power;
a second zoom lens group having negative refractive power;
a third zoom lens group having positive refractive power; and
a fourth zoom lens group having positive refractive power,
wherein the first focus lens group is a negative lens arranged on a closest side to the image in the third zoom lens group, and
wherein the second focus lens group is a positive lens included in the fourth zoom lens group.

19. The image capturing device according to claim 11, further comprising: in order from an object side,
a first zoom lens group having positive refractive power;
a second zoom lens group having negative refractive power;
a third zoom lens group having positive refractive power;
a fourth zoom lens group having negative refractive power; and
a fifth zoom lens group having positive refractive power,
wherein the first focus lens group is a negative lens included in the fourth zoom lens group, and
wherein the second focus lens group is a positive lens included in the fifth zoom lens group.

* * * * *